United States Patent
Matsubara et al.

(10) Patent No.: US 10,514,806 B2
(45) Date of Patent: Dec. 24, 2019

(54) OPERATION DETECTION DEVICE, OPERATION DETECTION METHOD AND PROJECTOR

(71) Applicant: MAXELL, LTD., Kyoto (JP)

(72) Inventors: Takashi Matsubara, Tokyo (JP); Sakiko Narikawa, Tokyo (JP); Naoki Mori, Tokyo (JP)

(73) Assignee: Maxell, Ltd., Tokyo (JP)

( * ) Notice: Subject to any disclaimer, the term of this patent is extended or adjusted under 35 U.S.C. 154(b) by 0 days.

(21) Appl. No.: 15/161,813

(22) Filed: May 23, 2016

(65) Prior Publication Data
US 2016/0266722 A1 Sep. 15, 2016

Related U.S. Application Data

(63) Continuation of application No. 14/187,488, filed on Feb. 24, 2014, now Pat. No. 9,367,176.

(30) Foreign Application Priority Data

Mar. 11, 2013 (JP) .................................. 2013-048305

(51) Int. Cl.
*G06F 3/042* (2006.01)
*G06F 3/0488* (2013.01)
(Continued)

(52) U.S. Cl.
CPC ............ *G06F 3/0425* (2013.01); *G06F 3/017* (2013.01); *G06F 3/042* (2013.01);
(Continued)

(58) Field of Classification Search
CPC ...... G06F 3/0426; G06F 3/0425; G06F 3/011; G06F 3/042; G06F 3/041; G06F 3/03; G06F 3/005; G06F 3/01; G06F 3/00; G06F 3/017; G06F 9/46; G06K 9/00355; G06K 9/4661; G06K 2009/00738; G06K 9/00744; G06K 9/00362; G06K 9/00375; G06K 9/00; H04N 9/31
(Continued)

(56) References Cited

U.S. PATENT DOCUMENTS

| 4,468,694 | A | * | 8/1984 | Edgar | ..................... G06F 3/037 348/135 |
| 7,242,388 | B2 | | 7/2007 | Lieberman | |

(Continued)

FOREIGN PATENT DOCUMENTS

| JP | 2008-59283 A | 3/2008 |
| JP | 2011-180712 A | 9/2011 |

*Primary Examiner* — Julie Anne Watko
(74) *Attorney, Agent, or Firm* — Mattingly & Malur, PC

(57) ABSTRACT

An operation detection device includes: first and second illuminations that irradiate illumination light from different positions onto an operation surface on which a user performs an operation, and a camera that captures the operation surface together with at least two fingers of a same hand of the user. First and second shadows of a same hand of the user are extracted from captured images obtained by the camera. Respective touch points of the same hand of the user on the operation surface are detected including when the first and second shadows corresponding to first and second fingers of the same hand have overlapping areas.

1 Claim, 21 Drawing Sheets

IN CASE OF A PLURALITY OF FINGERS (a) WHEN NOT TOUCHING (b) WHEN TOUCHING

(51) Int. Cl.
  *G06K 9/00* (2006.01)
  *G06F 3/01* (2006.01)
  *G06K 9/46* (2006.01)
  *H04N 9/31* (2006.01)
(52) U.S. Cl.
  CPC ..... *G06K 9/00375* (2013.01); *G06K 9/00355* (2013.01); *G06K 9/4661* (2013.01); *H04N 9/31* (2013.01)
(58) Field of Classification Search
  USPC ........................................................ 345/175
  See application file for complete search history.

(56) References Cited

U.S. PATENT DOCUMENTS

| | | |
|---|---|---|
| 7,893,924 B2 | 2/2011 | Lieberman |
| 8,611,667 B2* | 12/2013 | Wilson ................. G10H 1/0025 345/175 |
| 2002/0093666 A1* | 7/2002 | Foote ........................ G01S 5/16 356/621 |
| 2004/0108990 A1* | 6/2004 | Lieberman ............ G06F 3/0426 345/156 |
| 2008/0060854 A1 | 3/2008 | Perlin |
| 2011/0260962 A1* | 10/2011 | Benko ................. G06F 3/04883 345/156 |
| 2012/0249422 A1 | 10/2012 | Tse |
| 2013/0033614 A1 | 2/2013 | Chang |
| 2013/0088461 A1 | 4/2013 | Shamaie |
| 2014/0015950 A1 | 1/2014 | Kobayashi |
| 2014/0253512 A1* | 9/2014 | Narikawa ............ G06F 3/0304 345/175 |
| 2014/0267031 A1 | 9/2014 | Huebner |
| 2015/0102993 A1 | 4/2015 | Gadjali |
| 2015/0261385 A1 | 9/2015 | Tomono |

* cited by examiner

IN CASE OF ONE FINGER (a) WHEN NOT TOUCHING (b) WHEN TOUCHING

IN CASE OF A PLURALITY OF FINGERS (a) WHEN NOT TOUCHING (b) WHEN TOUCHING

CHANGE IN SHAPES OF SHADOWS (TOP VIEW)

CHANGE IN CONTOURS OF SHADOWS (AS VIEWED FROM CAMERA)

(a) METHOD FOR DETECTING CONTOURS (b) LEFT-SIDE CONTOURS (c) RIGHT-SIDE CONTOURS (a) SHADOWS WHEN TOUCHING (b) LEFT AND RIGHT CONTOURS OF SHADOWS

OPERATION DETECTION DEVICE, OPERATION DETECTION METHOD AND PROJECTOR

CROSS-REFERENCE TO RELATED APPLICATION

This application claims the Japanese Patent Application No. 2013-048305 filed Mar. 11, 2013, which is incorporated herein by reference in its entirety.

BACKGROUND OF THE INVENTION

1. Field of the Invention

The present invention relates to an operation detection device and an operation detection method that detect a finger operation of a user.

2. Description of the Related Art

A technology is proposed that captures an image of an operation part (finger) of a user and extracts the shadows thereof to detect a finger touch operation, without using a special device such as a touch sensor, as user operation input on a projection surface (screen) of a projection-type video display device (projector).

JP-2008-59283-A discloses an operation detection device including: a means for causing an imaging means to capture an image of an operator in a state lit by an illumination means; a means for detecting a region of a specific site of the operator on the basis of image data of the operator obtained by the imaging means; a means for extracting shadow portions from the detected region of the specific site of the operator; and a means for detecting, from among the extracted shadow portions, a plurality of line segments in which edges form straight lines, detecting points where the detected line segments intersect at acute angles, and detecting these intersecting points as pointing positions in the region of the specific site of the operator.

Furthermore, JP-2011-180712-A discloses a projection-type video display device including: a projection unit that projects video onto a screen; an imaging unit for capturing an image of a region including at least the video projected onto the screen; an actual image detection unit that detects an actual image of a predetermined object that moves above the screen, from the image captured by the imaging unit; a shadow detection unit that detects a shadow of the predetermined object produced by projection light from the projection unit, from the image captured by the imaging unit; a touch determination unit that determines that the predetermined object is touching the screen if the distance between the actual image of the predetermined object and a corresponding point of the shadow is equal to or less than a predetermined threshold value; and a coordinate determination unit that outputs the coordinates of the predetermined object as a pointing position with respect to the video when it has been determined by the touch determination unit that there is touching.

SUMMARY OF THE INVENTION

In JP-2008-59283-A, a shadow portion is extracted from the image data of the operator obtained by the imaging means, and points where the edges of the shadow intersect at acute angles are detected as pointing positions. However, when a hand is open and hovering, because other fingers can be seen overlapping the shadow of a certain finger, it is predicted that a plurality of points where the edges of the shadow intersect at acute angles will be generated, and there is therefore a risk of a point that is different from the pointing position being erroneously detected as a pointing position. Consequently, this method is not suitable for simultaneously detecting the pointing positions of a plurality of fingers when a hand is open, what is otherwise known as the detection of a multi-touch operation.

Furthermore, in JP-2011-180712-A, it is determined that a predetermined object (finger) is touching a screen if the distance between an actual image of the predetermined object and a corresponding point of the shadow is equal to or less than a predetermined threshold value. However, when a hand is open, it becomes no longer possible for some of the shadows of other fingers to be seen due to the actual image of a certain finger, and it is therefore difficult to detect the actual image of the finger and a corresponding point of a shadow. In addition, because the distance between the actual image of a finger and the shadow increases when the hand is open and hovering, for example, the tip end sections of the shadows of other fingers approach the tip end section of the actual image of a certain finger, and there is a risk that it may appear as if the distance between the actual image of the certain finger and a corresponding point of a shadow has become equal to or less than the threshold value, and the finger will be erroneously determined as touching the screen. Consequently, this method is also not suitable for the detection of a multi-touch operation.

The present invention takes the aforementioned problems into consideration, and an object thereof is to provide an operation detection device and an operation detection method that correctly detect each of the touch positions of a plurality of fingers even when a hand is open, and handle multi-touch operations.

A configuration described in the claims for example is adopted in order to solve the aforementioned problems.

The present application includes a plurality of units in order to solve the aforementioned problems, and, to give one example thereof, an operation detection device of the present invention includes: first and second illuminations that irradiate illumination light from different positions onto an operation surface; a camera that captures, together with an operation part of a user, the operation surface onto which the illumination light has been irradiated; a shadow region extraction unit that extracts first and second shadows of the operation part of the user from a captured image obtained by the camera; a contour detection unit that detects contours of each of the first and second shadows extracted; and a touch point detection unit that detects a touch point of the operation part of the user on the operation surface from the distance between the contours. The shadow region extraction unit compares the brightness of the captured image with a predetermined threshold value, and discerns and extracts the first and second shadows of the operation part of the user projected by the first and second illuminations, the contour detection unit extracts, as contours, corresponding substantially linear line segments from within the contours of the first and second shadows, and the touch point detection unit determines that the operation part of the user has touched the operation surface when the distance between the two extracted contours has become equal to or less than a predetermined threshold value.

According to the present invention, it is possible to correctly detect the touch positions of a plurality of fingers on an operation surface, and to realize a highly accurate multi-touch operation, without providing a touch sensor or the like on the operation surface.

DESCRIPTION OF THE PREFERRED EMBODIMENTS

The embodiments are described hereafter using the drawings.

First Embodiment

In a first embodiment, a description is given with respect to an operation detection device that uses one camera and two illuminations arranged in different positions to detect a touch point where an operation part (finger) of a user touches an operation surface.

Figure 1:
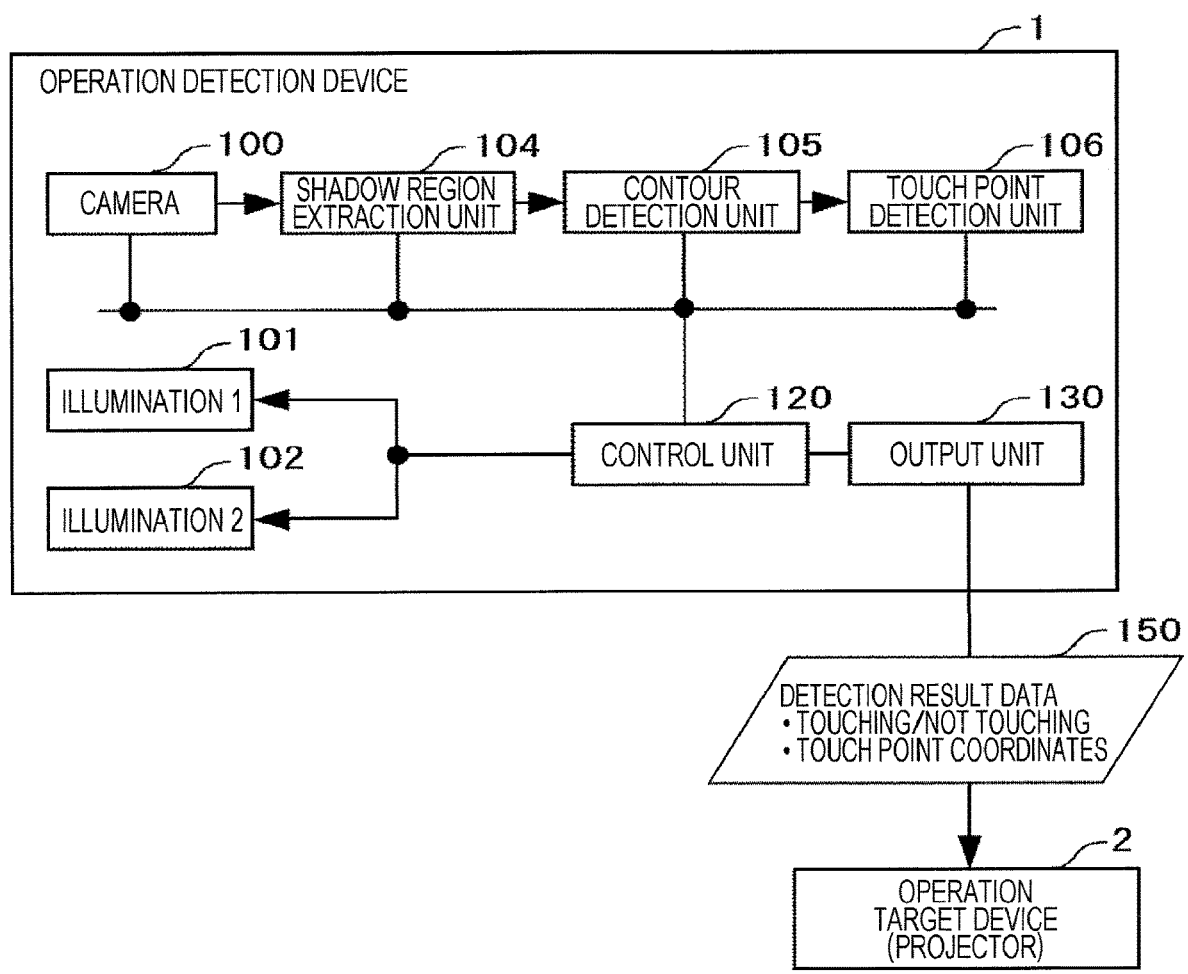
FIG. 1 is a configuration diagram of an operation detection device according to a first embodiment.

FIG. 1 depicts a configuration diagram of an operation detection device according to the first embodiment. An operation detection device 1 includes a camera 100, two illuminations 101 and 102, a shadow region extraction unit 104, a contour detection unit 105, a touch point detection unit 106, a control unit 120, and an output unit 130, and outputs, to an operation target device 2, detection result data 150 such as the touch position of a finger on an operation surface. The operation target device 2 is a projector for example, receives the detection result data 150, and performs video display in accordance with a user operation. Although all of the elements 100 to 106, 120, and 130 are configured inside the operation detection device 1 in FIG. 1, some of the constituent elements, the camera 100 and the illuminations 101 and 102 for example, may be configured outside the operation detection device 1, and may be connected via a network or a Universal Serial Bus (USB). Although the constituent elements 100 to 106, 120, and 130 are independent of each other, they may be configured from one or a plurality of constituent elements as required. For example, the elements 104 to 106, 120, and 130 may be configured in such a way that the processing thereof is performed by one or a plurality of central processing devices (CPUs).

Figure 2A:
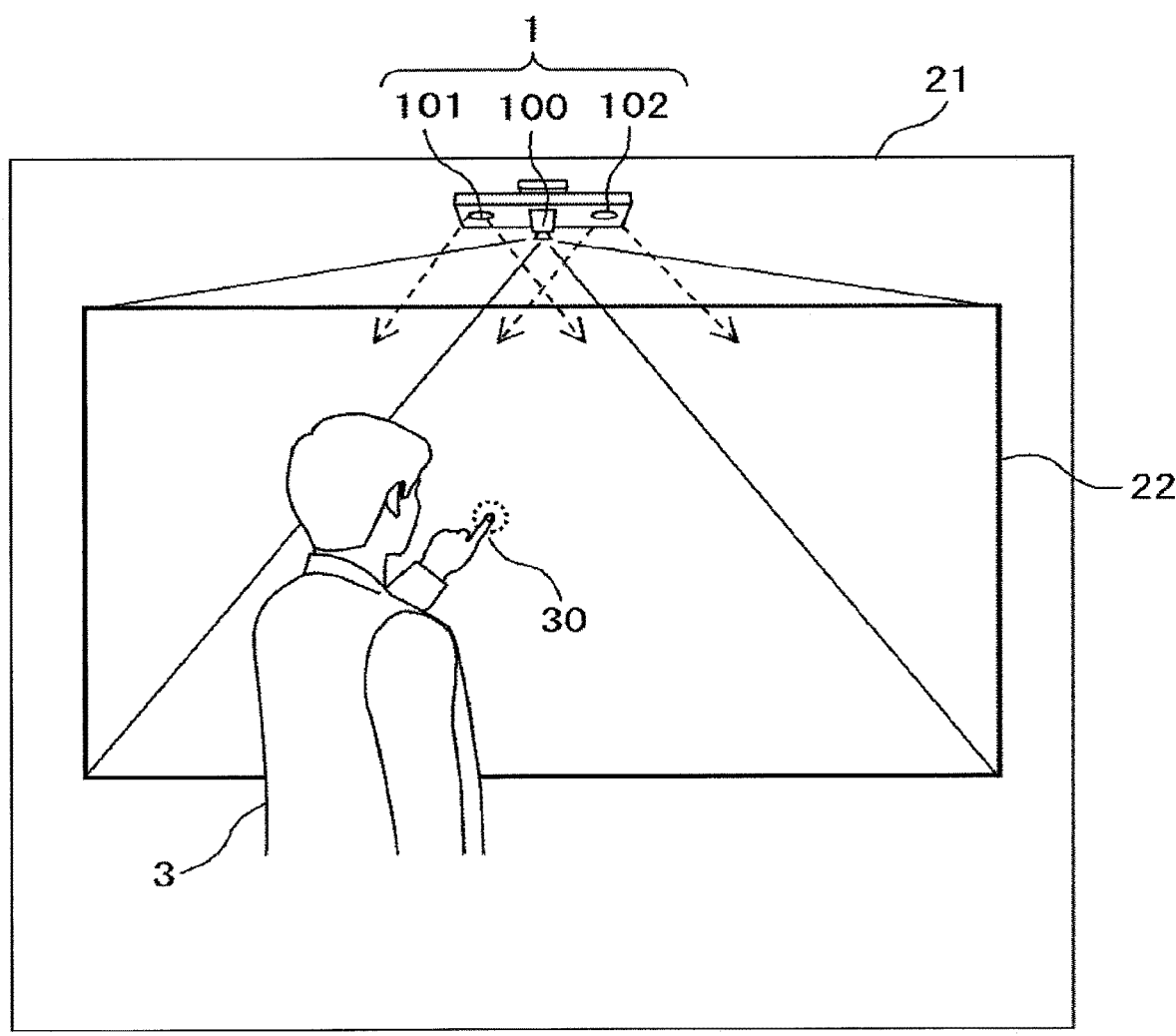
FIG. 2A is a front view depicting a user operation in which an operation detection device is used (a camera is configured internally)
Figure 2B:
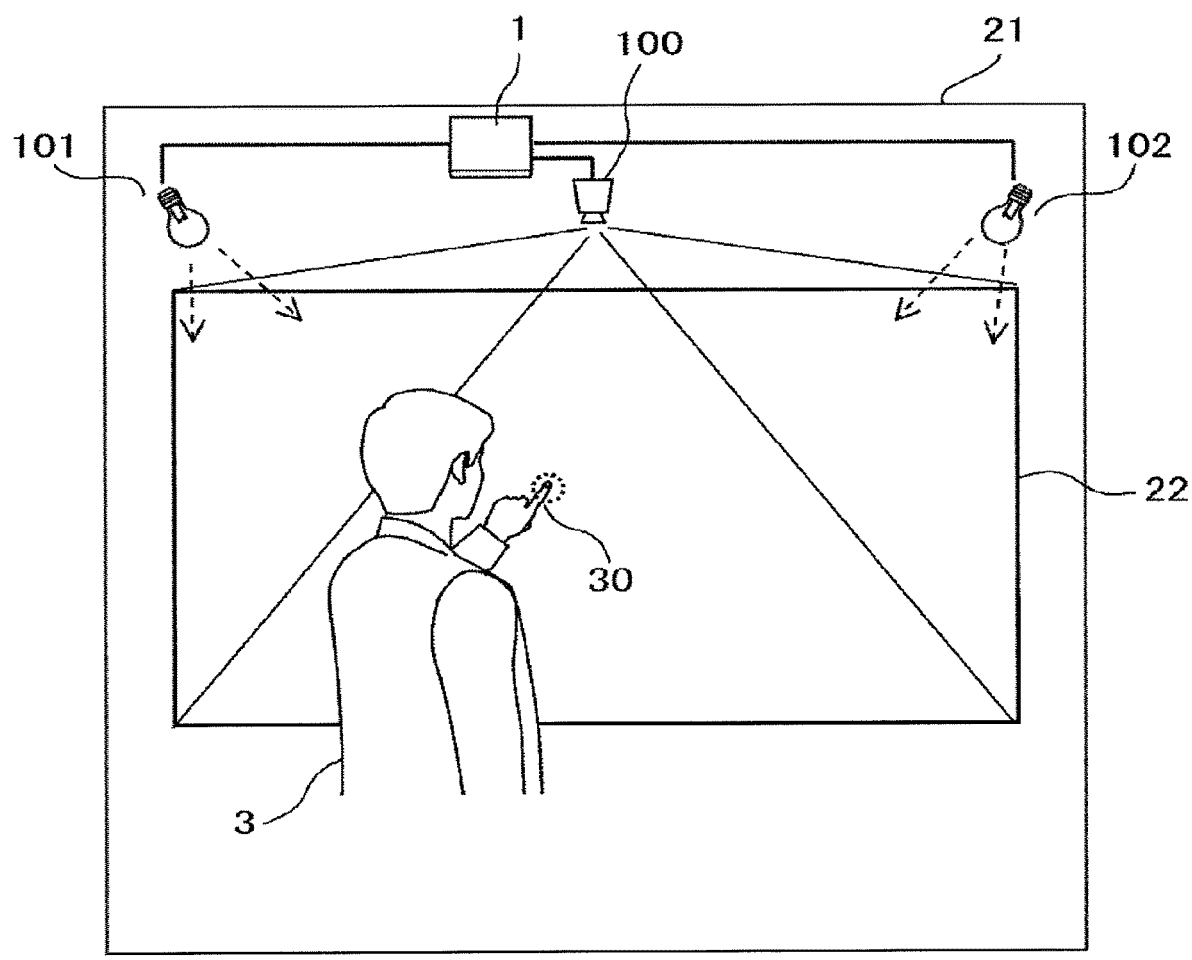
FIG. 2B is a front view depicting a user operation in which an operation detection device is used (a camera is configured externally)
Figure 3:
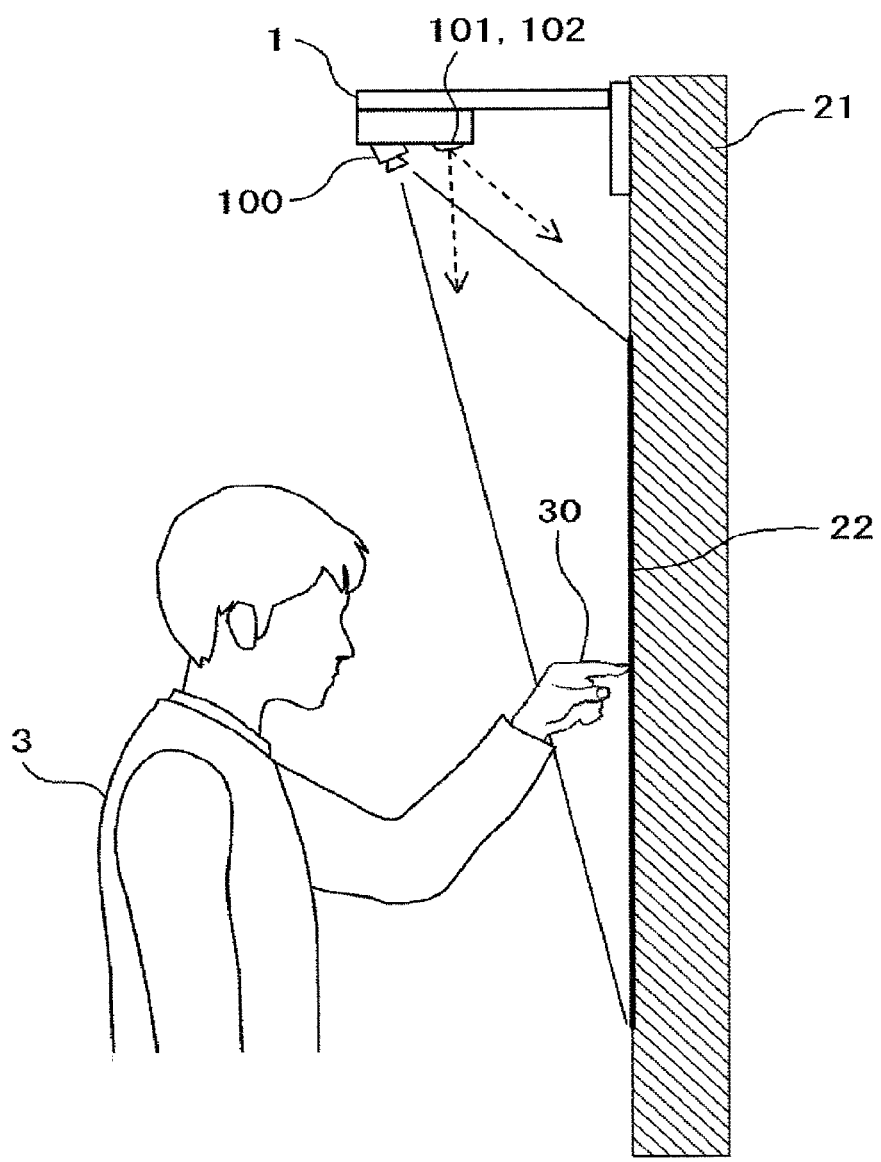
FIG. 3 is a side view depicting a user operation in which an operation detection device is used.

FIG. 2A, FIG. 2B, and FIG. 3 are drawings depicting a state in which a user 3 performs an operation using an operation detection device 1. FIG. 2A and FIG. 2B are front views of the operation state, and FIG. 3 is a side view of the operation state. It should be noted that FIG. 2A depicts the case where the camera 100 and the illuminations 101 and 102 have been configured inside the operation detection device 1, and FIG. 2B depicts the case where the camera 100 and the illuminations 101 and 102 have been configured outside the operation detection device 1. The user 3 performs a desired operation by causing a certain finger 30, which constitutes an operation part, to touch a certain position on an operation surface 22 of a wall surface 21. In the case where the operation target device 2 is a projector, the operation surface 22 is a screen that displays projected video, and the user performs an operation on the screen.

The operation detection device 1 is attached to the upper section of the wall surface 21, and the two illuminations 101 and 102 are arranged offset in different positions in the horizontal direction on the wall surface 21, on either side of the camera 100. It should be noted that, in FIG. 2B, the two illuminations 101 and 102 are arranged in the left and right end sections of the wall surface 21. The finger 30 of the user 3 is irradiated by the two illuminations 101 and 102, and the finger 30 and the vicinity thereof are captured by the camera 100. The operation detection device 1 analyses an image captured by the camera 100 and detects the touch point of the finger from the shapes of the shadows of the finger 30 changing when the finger 30 touches the operation surface 22.

Next, the operations of the units are described. The camera 100 is configured from an image sensor and a lens and so forth, and captures an image including the finger 30 that constitutes the operation part of the user 3. The two illuminations 101 and 102 are configured from light-emitting diodes, circuit boards, and lenses so forth, irradiate illumination light onto the operation surface 22 and the finger 30 of the user 3, and project shadows of the finger 30 in the image captured by the camera 100. It should be noted that the illuminations 101 and 102 may be infrared-light illuminations, and the camera 100 may be configured from an infrared-light camera. It is thereby possible for an infrared-light image captured by the camera 100 to be separated from a visible-light image projected by the operation target device 2 (projector) and acquired.

The shadow region extraction unit 104 is configured from a circuit board or software or the like, and extracts shadows from an image obtained by the camera 100 and generates a shadow image. For example, the background image of the operation surface 22, which is captured in advance, is subtracted from an image captured during the detection of an operation and a difference image is generated, the brightness of the difference image is binarized using a predetermined threshold value Lth, and regions that are equal to or less than the threshold value are preferably taken as shadow regions. In addition, processing is performed in which shadow regions that are not mutually connected to the extracted shadows are each discerned as separate shadows, what is otherwise known as labeling processing. As a result of the labeling processing, it is possible to identify which fingers correspond to the plurality of extracted shadows.

The contour detection unit 105 is configured from a circuit board or software or the like, and extracts the contours of the shadow regions from the shadow image. For example, contours are obtained by scanning within a shadow image in a constant direction (from the top-left to the bottom-right) to determine a starting pixel for contour tracking, and tracking the neighboring pixels of the starting pixel in a counterclockwise manner. A method for detecting contours is described using FIG. 6. It should be noted that the processing of the shadow region extraction unit 104 and the contour detection unit 105 is not restricted to the aforementioned method, and another image processing algorithm may be used.

The touch point detection unit 106 is configured from a circuit board or software or the like, and, on the basis of the shapes and positions of contours, determines the touch state of the finger 30 with respect to the operation surface 22, and also detects a touch point (coordinates). A method for detecting a touch point is described using FIGS. 5A and 5B and FIG. 8.

The control unit 120 is configured from a circuit board or software or the like, and controls the illuminations 101 and 102, the shadow region extraction unit 104, the contour detection unit 105, the touch point detection unit 106, and the output unit 130 on the basis of a captured operation in an image captured by the camera 100.

The output unit 130 is an interface that outputs the detection result data 150 to the operation target device (projector) 2, which constitutes the operation target, and is configured from a network connection or a Universal Serial Bus (USB) connection, an ultrasound unit, or an infrared-ray communication device or the like. Touch state information regarding whether or not the finger 30 is touching the operation surface 22 and touch point coordinates are included in the detection result data 150.

Figure 4A:
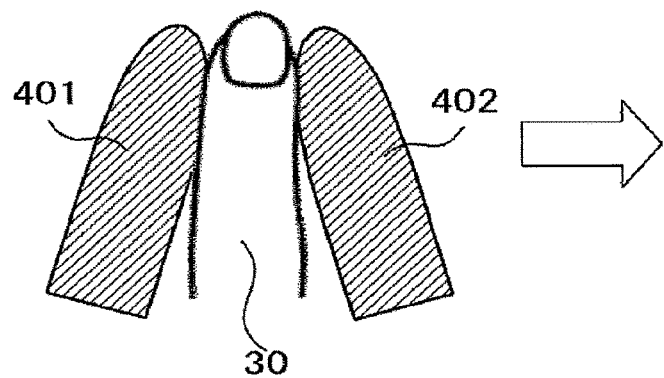
FIG. 4A is a drawing depicting the shapes of the shadows of a finger of a user captured by a camera (in the case of one finger)
Figure 4A:
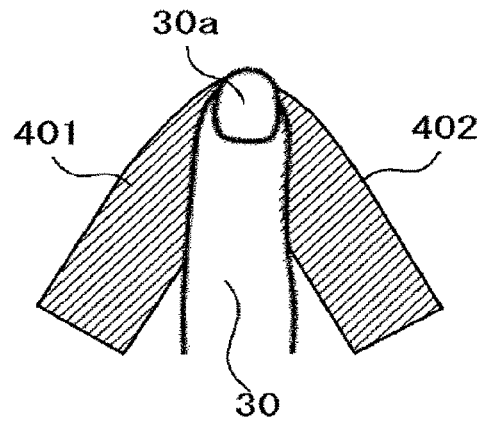
Figure 4B:
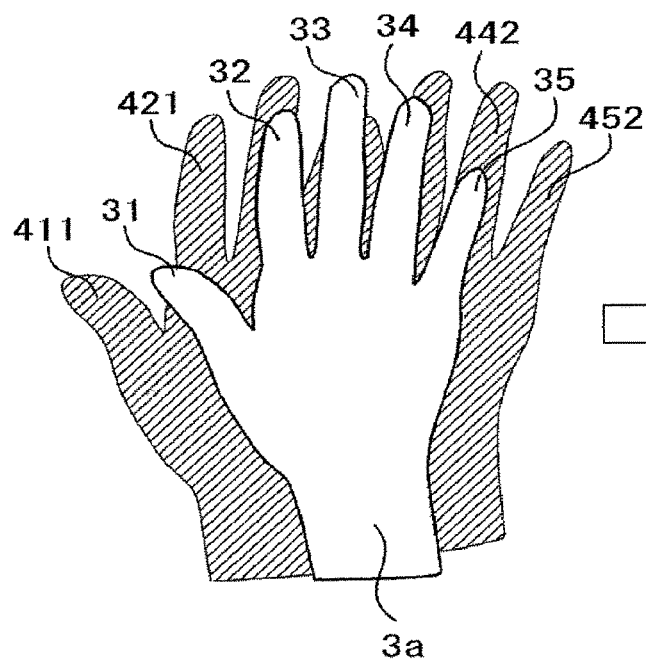
FIG. 4B is a drawing depicting the shapes of the shadows of the fingers of a user captured by a camera (in the case of a plurality of fingers)
Figure 4B:
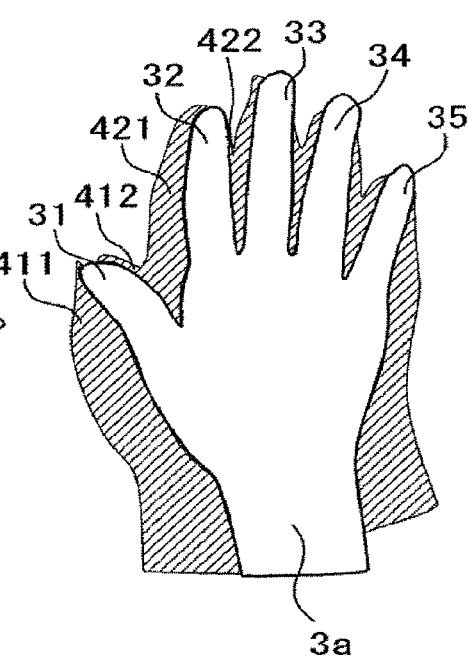

FIG. 4A and FIG. 4B are drawings depicting the shapes of the shadows of the fingers of a user captured by a camera. FIG. 4A depicts the case of one finger, and FIG. 4B depicts the case of a plurality of fingers in which a hand is open. The way in which the shapes of the shadows change is indicated by state (a) in which the finger 30 of the user is not touching the operation surface 22 (paper surface) and state (b) in which the finger 30 of the user has touched the operation surface 22.

In FIG. 4A, in state (a) in which the finger 30 of the user is not touching the operation surface 22, two shadows 401 and 402 (indicated by diagonal lines) caused by the two illuminations 101 and 102 at the left and right of the finger 30 are formed. The shadow 401 on the left side is projected by the illumination 102 on the right side, and the shadow 402 on the right side is projected by the illumination 101 on the left side. These two shadows 401 and 402 are separate from each other. Meanwhile, in state (b) in which the tip end section (fingertip) of the finger 30 is touching the operation surface 22, the two shadows 401 and 402 have approached the position of a fingertip 30a. It should be noted that although partial regions at the tip-end sides of the shadows 401 and 402 are hidden behind the finger 30, these hidden portions are not included in the shadow regions.

Meanwhile, although FIG. 4B depicts the case of a plurality (five) of fingers 31, 32, . . . 35 in which the hand is open, this is basically the same as the case of one finger in FIG. 4A. In state (a) in which the fingers are not touching the operation surface, shadows (indicated by diagonal lines) are formed to the left and right of each of the fingers. However, in this state, because several of the shadows are hidden by other fingers and overlap the shadows of the other fingers, the shadows that can be clearly seen are the shadow 411 on the left side of the finger 31, the shadow 421 on the left side of the finger 32, the shadow 442 on the right side of the finger 34, and the shadow 452 on the right side of the finger 35 and so forth. Meanwhile, in state (b) in which the fingers are touching the screen, the two shadows of each finger have become clear and have approached the positions of the fingertips. Here, reference numerals are appended and indicated with respect to the two shadows 411 and 412 of the finger 31, and the two shadows 421 and 422 of the finger 32.

Figure 5A:
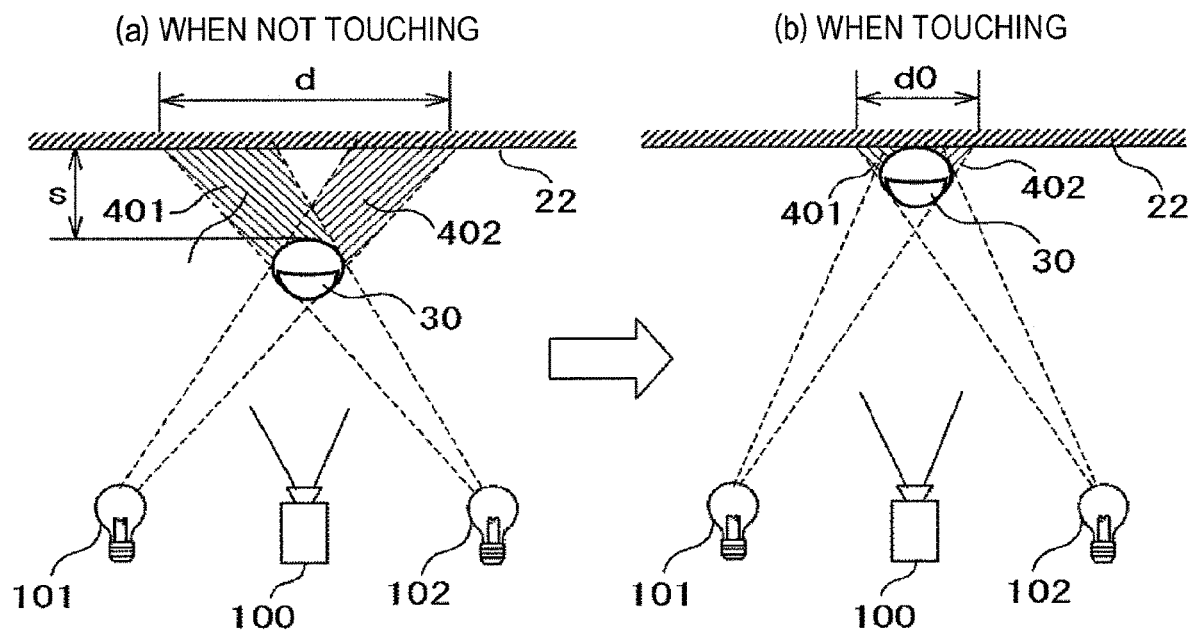
FIG. 5A is a drawing illustrating a change in the shapes of the shadows of a finger (top view)
Figure 5B:
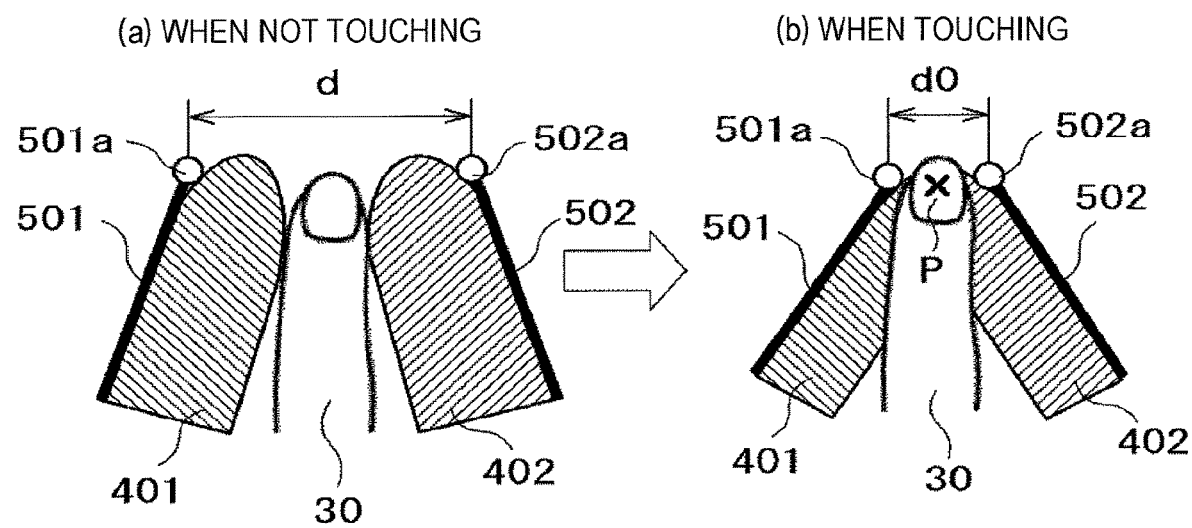
FIG. 5B is a drawing illustrating a change in the contours of the shadows of a finger (as viewed from a camera)

FIG. 5A and FIG. 5B are drawings illustrating a method for determining a touch from the shapes of the shadows of a finger. FIG. 5A is a drawing illustrating a change in the shapes of shadows as viewed from above (the ceiling side) the operation surface 22. FIG. 5B is a drawing illustrating a change in the contours of shadows when viewing the operation surface 22 from the camera side. State (a) in which the finger 30 of the user is not touching the operation surface 22 and state (b) in which the finger 30 of the user has touched the operation surface 22 are compared in both drawings. Although a description is given here with respect to the case of one finger 30 (FIG. 4A) for simplicity, the description also applies to the case of a plurality of fingers (FIG. 4B).

In FIG. 5A, in state (a) in which the finger 30 is not touching the operation surface 22, light from the two illuminations 101 and 102 is blocked by the finger 30, and the shadows 402 and 401 (indicated by diagonal lines) are formed. At this time, because an actual image of the finger 30 is captured at the front in the image captured by the camera 100, the portion at the rear side of the finger 30 is not captured as a shadow. As a result, in the image captured by the camera 100, the two shadows 401 and 402 are separate from each other. Here, the distance between the outer sides of the shadows 401 and 402 is taken as d. This distance d is dependent upon the space s between the finger 30 and the operation surface 22, and the distance d increases as the space s increases. Meanwhile, in state (b) in which the finger 30 is touching the operation surface 22, because the space s=0, the distance between the outer sides of the shadows 401 and 402 is the smallest value do. Therefore, by measuring the distance d between the outer sides of the shadows 401 and 402, it is possible to determine whether or not the finger 30 has touched the operation surface 22.

In FIG. 5B, shadows in which the shape of the finger 30 is projected are captured in the camera image. A contour 501 on the left side (outer side) of the shadow 401 formed on the left side of the finger 30, and a contour 502 on the right side (outer side) of the shadow 402 formed on the right side are then detected from within the contours of the shadows. With regard to these contours, only corresponding substantially linear line segments are extracted from within the contours that surround the shadows, and the curved portions of the fingertips are not included. The shortest distance d between the two extracted contours 501 and 502 is then obtained as the distance between the two shadows 401 and 402. In this case, the contours 501 and 502 are not parallel, and ordinarily the shortest distance d is determined between the end sections 501a and 502a at the fingertip side.

In state (a) in which the finger 30 is not touching the operation surface 22, because the two shadows 401 and 402 are separate from each other, the shortest distance d between the two contours 501 and 502 also becomes a large value. Meanwhile, in state (b) in which the finger 30 is touching the operation surface 22, the two shadows 401 and 402 have approached each other, and the two contours 501 and 502 have also approached each other. The shortest distance therebetween becomes the smallest value d0 at the end sections 501a and 502a at the fingertip side. Consequently, by defining a predetermined threshold value dth (here, dth>d0), and determining whether or not the shortest distance d between the contours 501 and 502 is within the threshold value dth, it is possible to determine whether or not the finger 30 is touching the operation surface 22. In this example, because the contours 501 and 502 are extracted from the outer side portions of the two shadows 401 and 402, the change in the distance between the contours is notable compared to when extraction is performed from the inner side portions, and as a result there is an improvement in touch detection accuracy.

If it has been determined that the finger 30 has touched the operation surface 22, a center point P of the end sections 501a and 502a of the contours 501 and 502 is determined as the touch point, and the coordinate values of the touch point on the operation surface 22 are calculated. It should be noted that, in order to accurately calculate the coordinates of the touch point, a correction to offset the coordinates of the center point P in the fingertip direction by a predetermined amount may be implemented as required.

Figure 6:
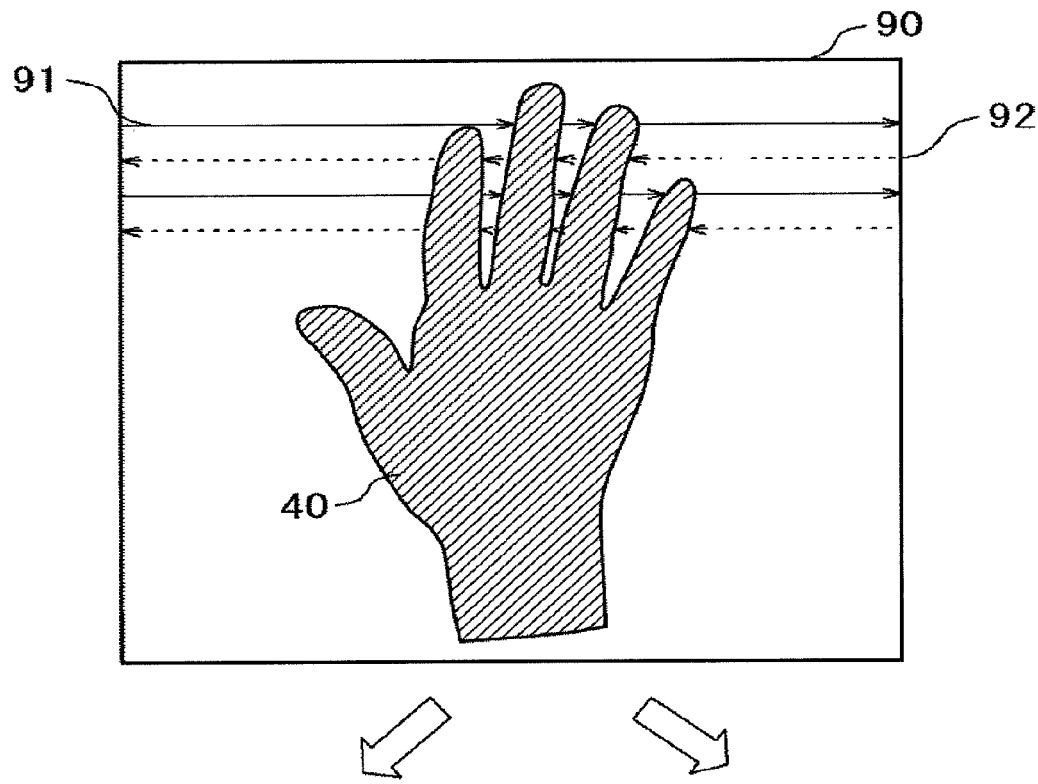
FIG. 6 is a drawing illustrating a method for detecting the contours of a shadow.
Figure 6:
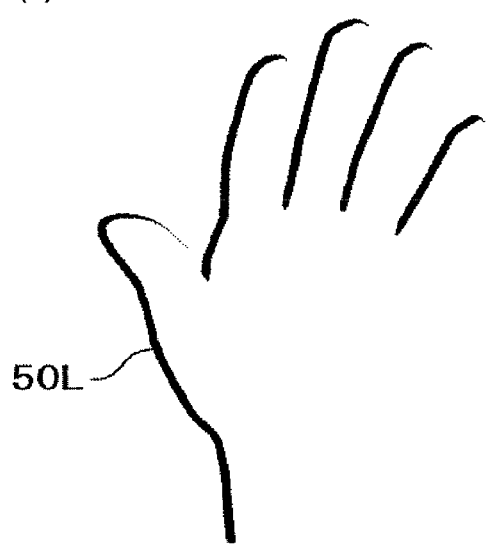
Figure 6:
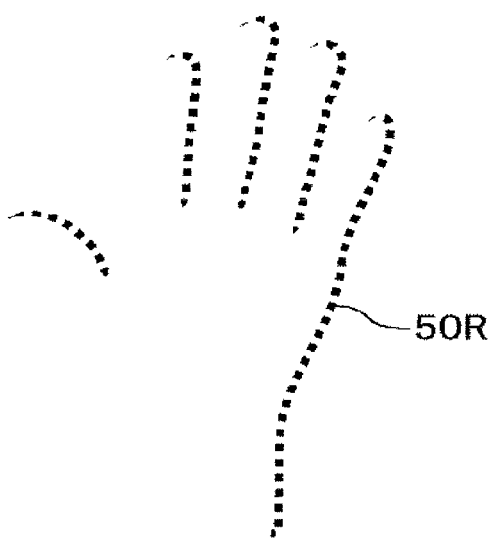

FIG. 6 is a drawing illustrating a method for detecting the contours of a shadow. As depicted in FIG. 6(a), an image 40 of the shadow of a hand is included within an imaging screen 90. When the left-side contours are to be obtained, the presence/absence of shadow pixels is detected in scanning lines 91 (solid lines) going from the left to the right side within the screen 90. At this time, a position where the scanned pixel switches from a non-shadow pixel (taken as pixel 0) to a shadow pixel (taken as pixel 1) becomes a left-side contour. When a plurality of finger shadows are present as in the drawing, the pixels switch from pixel 0 to pixel 1 at each finger shadow, and a plurality of contours are detected. The left-side contour 50L depicted in (b) is obtained in this way.

Likewise, when the right-side contours are to be obtained, the presence/absence of shadow pixels is detected in scanning lines 92 (dotted lines) going from the right to the left side within the screen 90. The right-side contour 50R depicted in (c) is obtained in this way. Curved portions such as fingertips are removed from among the contours 50L and 50R obtained in this way, and contours made up of substantially linear line segments are detected. It should be noted that the aforementioned method is an example, and another algorithm may be used for the detection of contours.

Figure 7:
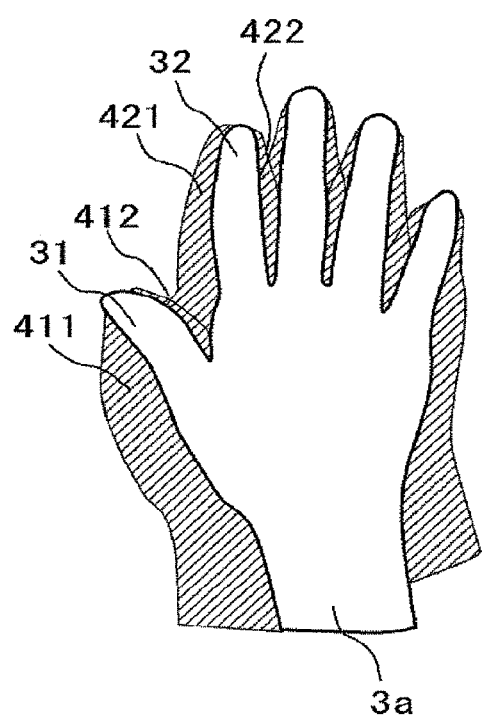
FIG. 7 is a drawing depicting the states of contours when an operation is performed by a plurality of fingers.
Figure 7:
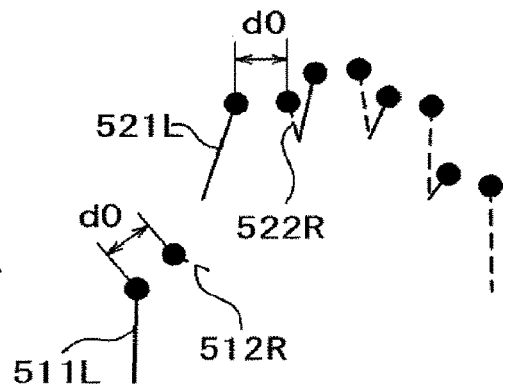

FIG. 7 is a drawing depicting the states of contours when an operation is performed by a plurality of fingers. As in (a), when the plurality of fingers 31, 32 . . . have been made to touch the operation surface while the hand 3a is open, the left-side shadows 411, 421 . . . and the right-side shadows 412, 422 . . . are formed with respect to the fingers. (b) depicts the contours thereof, and depicts the left-side contours 511L, 521L . . . of the left-side shadows 411, 421 . . . , and the right-side contours 512R, 522R . . . of the right-side shadows 412, 422 . . . . The shortest distance between the corresponding contours of the fingers becomes the smallest value d0 in the vicinity of the fingertips thereof. This distance becomes substantially equal even if the fingertip direction is inclined from the vertical direction as with the finger 31. Thus, according to the present embodiment, the touches of a plurality of fingers can be independently detected even when the hand is open, and it becomes possible to apply the present embodiment to a multi-touch operation.

Figure 8:
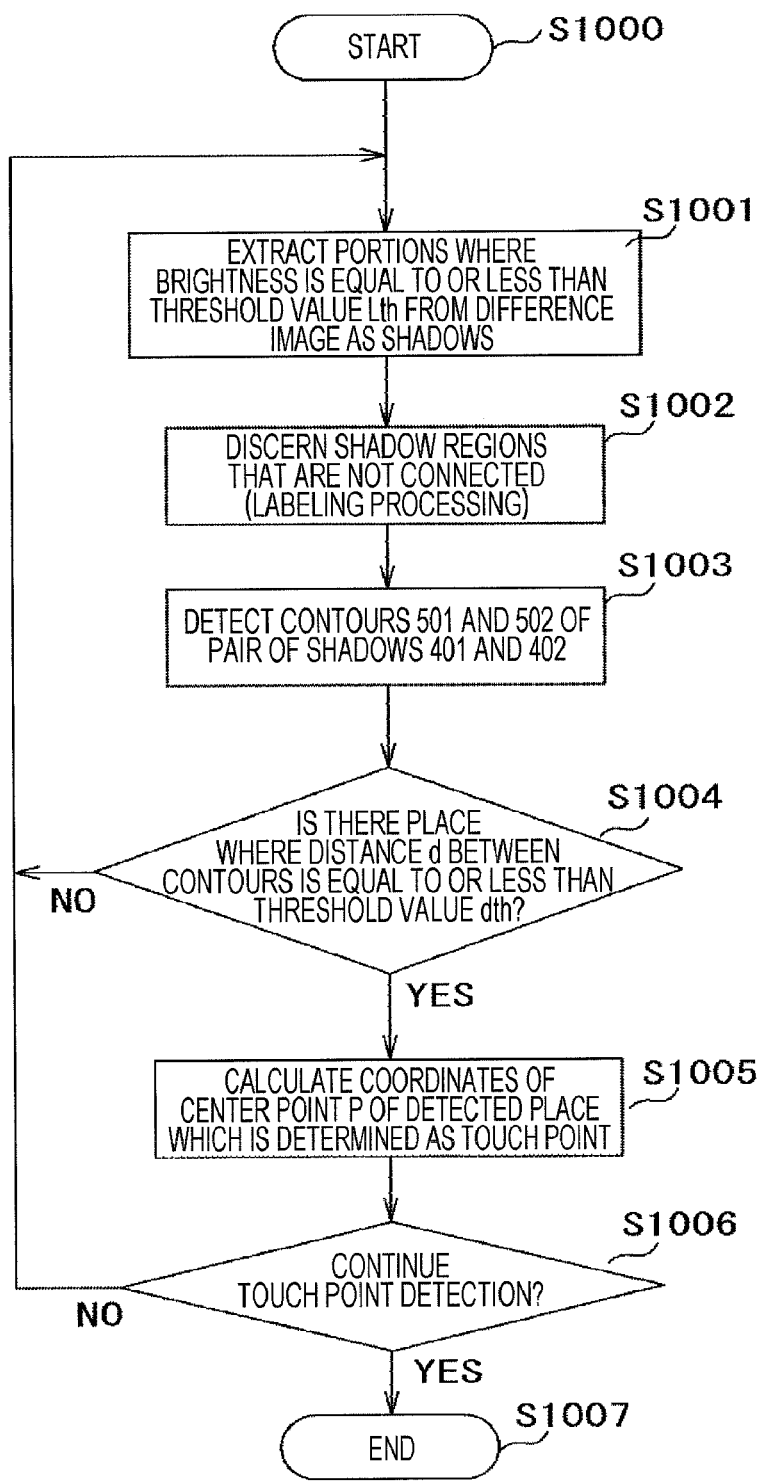
FIG. 8 is a drawing depicting the processing flow for touch point detection in the first embodiment.

FIG. 8 is a drawing depicting the processing flow for touch point detection in the first embodiment.

In S1000, the operation detection device 1 starts processing for detecting the touch point of a finger. Illumination light is irradiated from the two illuminations 101 and 102 due to an instruction from the control unit 120, and the operation surface is captured by the camera 100.

In S1001, the shadow region extraction unit 104 subtracts the background from the image captured by the camera 100 and obtains a difference image, and portions where the brightness is equal to or less than the threshold value Lth are extracted as shadow regions. In S1002, the shadow region extraction unit 104 performs processing in which shadow regions that are not mutually connected to the extracted shadows are each discerned as separate shadows, what is otherwise known as labeling processing.

In S1003, the contour detection unit 105 detects contours with respect to the shadows that have been subjected to labeling processing. For example, as in FIG. 5B, the contour 501 on the left side of the shadow 401, and the contour 502 on the right side of the shadow 402 are detected. Here, when there are a plurality of finger shadows, the determining of a pair of shadows corresponding to a specific finger is performed on the basis of labeling processing, and the left/right switching between contours with respect to the shadows is performed on the basis of the procedure in FIG. 6.

In S1004, the touch point detection unit 106 determines whether or not there is a place where the shortest distance d between the detected contours 501 and 502 is equal to or less than the threshold value dth. This threshold value dth is defined in such a way that it is possible to identify the distance d0 between the end sections 501a and 502a of the contours when a finger is touching as in FIG. 5B. If the result of the determination is that there is such a place, processing advances to S1005. If there is no such a place, processing returns to S1001, and the aforementioned processing is repeated.

In S1005, the touch point detection unit 106 determines, as a touch point, the center point P of the place (place where the shortest distance d is equal to or less than the threshold value dth) detected in S1004, and calculates the coordinate values of the touch point on the operation surface 22. The output unit 130 outputs the calculated touch point coordinates as detection result data 150.

In S1006, it is determined whether the touch point detection is to be continued due to an instruction or the like from the user, and if the touch point detection is to be continued, processing returns to S1001 and the aforementioned processing is repeated.

As described above, the operation detection device of the first embodiment uses one camera and two illuminations to detect the contours of two shadows projected by the two illuminations. A touch point is then detected from a place where the shortest distance between the contours has approached within a predetermined distance, and the coordinates of the touch point are output. In this method, because the touches of a plurality of fingers can each be independently detected when the hand is open, it is possible for detection to be performed correctly even with respect to a multi-touch operation.

The operation target device 2 has been described using the example of a projector; however, it is also possible for the operation target device 2 to be applied to a general display or a head-mounted display or the like. The operation surface is not restricted to a screen, and can be applied to any type of surface such as a wall surface or a table.

Second Embodiment

In a second embodiment, a configuration is implemented in which the touch point of a finger is detected by alternately turning on the two illuminations 101 and 102 of the operation detection device 1.

Figure 9:
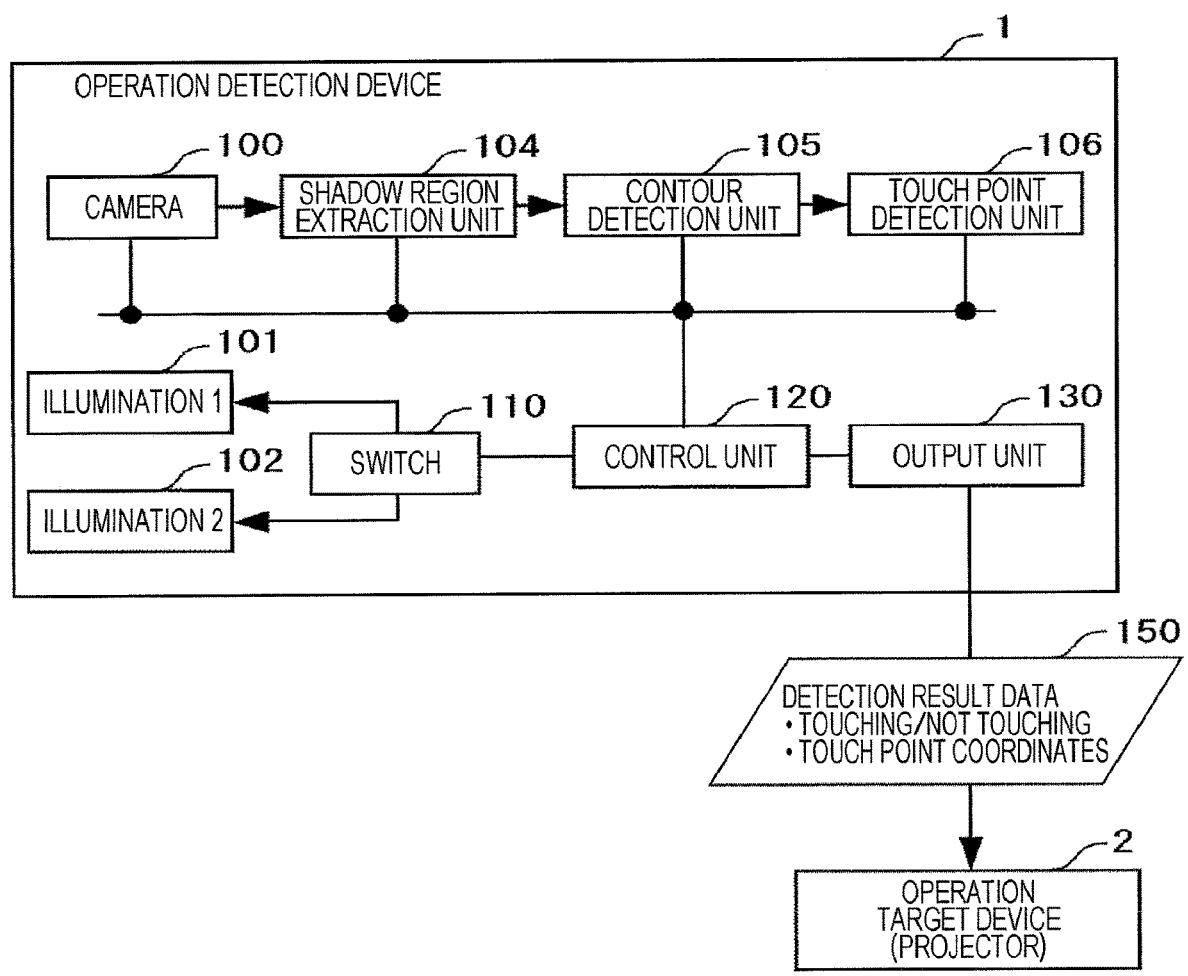
FIG. 9 is a configuration diagram of an operation detection device according to a second embodiment.

FIG. 9 depicts a configuration diagram of an operation detection device according to the second embodiment. The difference with the first embodiment (FIG. 1) is that a switch 110 for illumination switching has been added. The switch 110 is configured from a circuit board and so forth, and alternately turns on the illumination 101 and the illumination 102 in accordance with an instruction from the control unit 120. At such time, the control unit 120 switches the imaging performed by the camera 100, in accordance with the timing at which the illumination 101 and the illumination 102 are turned on. Therefore, only the shadows projected by the illumination 101 are captured in an image of a certain timing (frame 1) captured by the camera 100 for example, and only the shadows projected by the illumination 102 are captured in an image of the next timing (frame 2). Consequently, images are obtained in which the positions of finger shadows switch in each frame, and it is possible for the touch of a finger to be easily detected from the distance between the two shadows.

The second embodiment has a feature in that, because shadows are extracted by alternately turning on the illuminations, two shadows can be temporally separated and detected even if the two shadows partially overlap. Therefore, it is possible for a touch point to be correctly detected even if the two illuminations 101 and 102 are installed on the same side of the camera 100, and two shadows are formed on the same side of a finger and partially overlap. In the following example, a description is given with respect to the case where the illuminations 101 and 102 are installed on the same side of the camera 100. Naturally, it goes without saying that the second embodiment is effective also when the two illuminations 101 and 102 are installed on mutually opposite sides on either side of the camera 100.

Figure 10A:
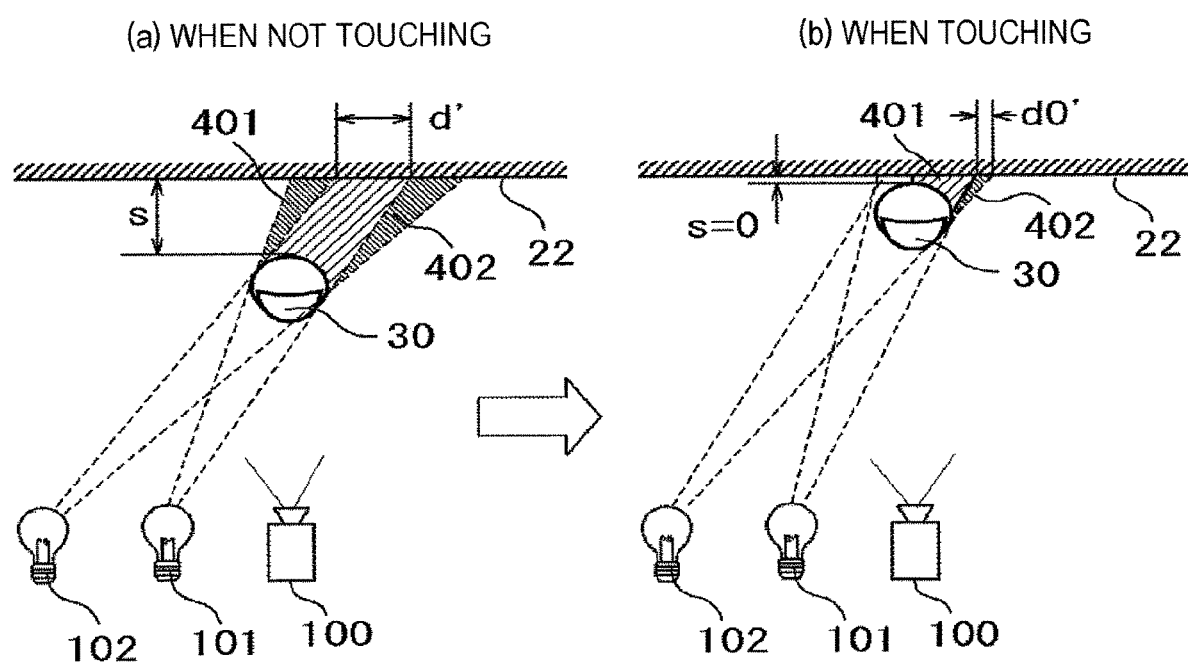
FIG. 10A is a drawing illustrating a change in the shapes of the shadows of a finger (top view)
Figure 10B:
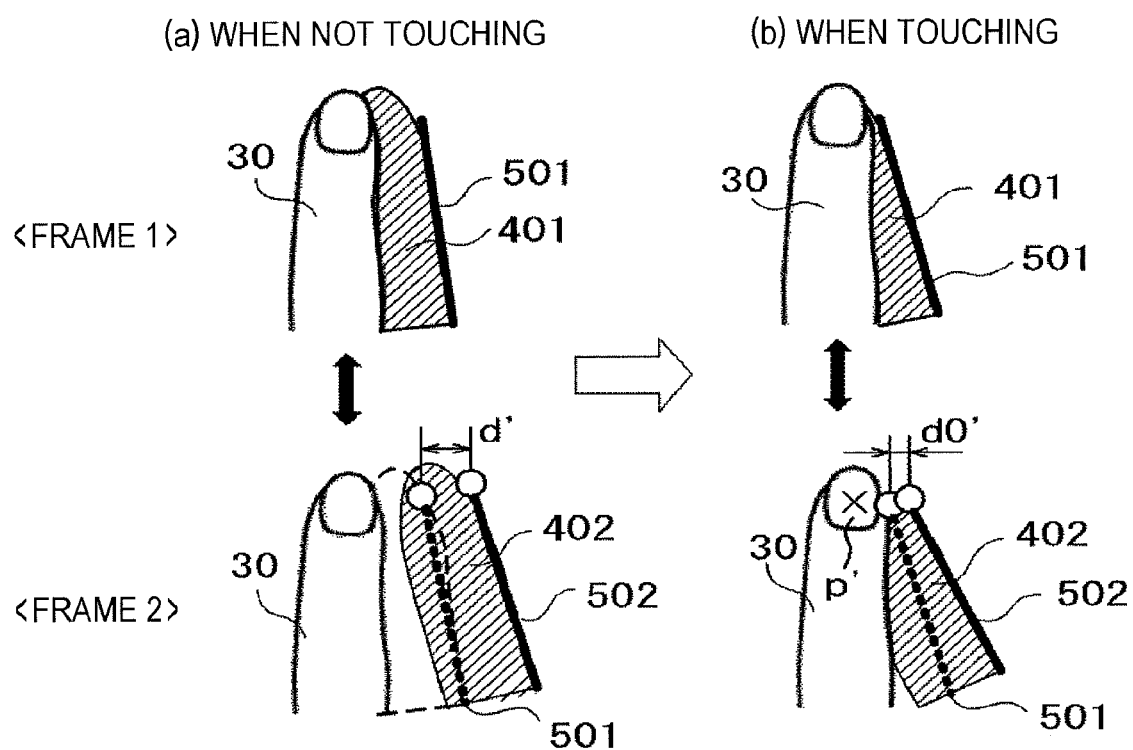
FIG. 10B is a drawing illustrating a change in the contours of the shadows of a finger (as viewed from a camera)

FIG. 10A and FIG. 10B are drawings depicting changes in the shapes of the shadows of a finger when the two illuminations 101 and 102 are installed on the same side of the camera 100. FIG. 10A is a top view as viewed from above (the ceiling side) the operation surface 22. FIG. 10B is a drawing in which the operation surface 22 is viewed from the camera side. State (a) in which the finger 30 of the user is not touching the operation surface 22 and state (b) in which the finger 30 of the user has touched the operation surface 22 are compared in both drawings.

When the illumination 101 is turned on in frame 1, a shadow 401 of the finger 30 is formed, and when the illumination 102 is turned on in frame 2, the shadow 402 is formed. Both of the shadows 401 and 402 are on the same side (the right side in the drawings) of the finger 30.

The contours of the shadows in this case are, as depicted in FIG. 10B, both extracted from the outer sides of the shadows as viewed from the finger 30 (the right side in the drawings). In other words, the contour 501 of the shadow 401 is extracted in frame 1, the contour 502 of the shadow 402 is extracted in frame 2, and the shortest distance d' between the contours 501 and 502 is obtained. Where the distance d' becomes the shortest is ordinarily near the fingertips at the end sections of the contours (indicated by the white circle marks). The distance d' is dependent upon the space s between the finger 30 and the operation surface 22, and becomes the smallest value d0' when the finger touches the operation surface. It should be noted that this value d0' is different from the value d0 in the first embodiment (FIG. 5A, FIG. 5B), and becomes a smaller value. In this case, by defining a predetermined threshold value dth' (here, dth'>d0'), and determining whether or not the shortest distance d' between the contours 501 and 502 is within the threshold value dth', it is possible to determine whether or not the finger 30 is touching the operation surface 22.

Figure 11:
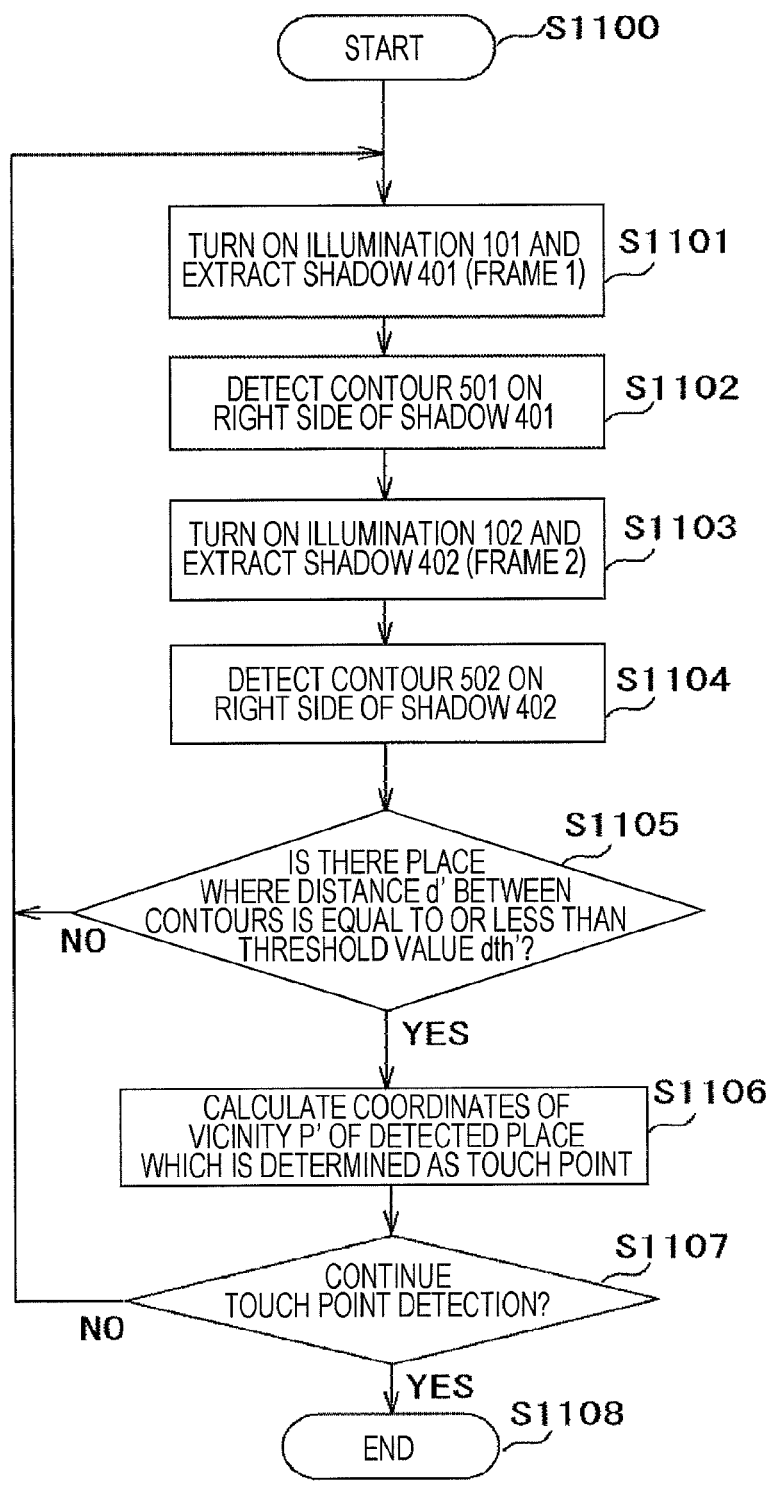
FIG. 11 is a drawing depicting the processing flow for touch point detection in the second embodiment.

FIG. 11 is a drawing depicting the processing flow for touch point detection in the second embodiment. Here, a description is given with respect to the case where, as depicted in FIG. 10A and FIG. 10B, the two illuminations 101 and 102 are installed on the same side of the camera 100, and a touch point is detected from the two shadows 401 and 402 produced at the finger 30.

In S1100, the operation detection device 1 starts processing for detecting the touch point of a finger.

In S1101, at the timing of frame 1, the illumination 101 is turned on due to an instruction from the control unit 120, and an image is captured by the camera 100. The shadow region extraction unit 104 extracts, from the captured image, the shadow 401 formed on the right side of the finger 30. In S1102, the contour detection unit 105 detects the contour 501 on the right side of the shadow 401.

In S1103, at the timing of frame 2, the illumination 102 is turned on due to an instruction from the control unit 120, and an image is captured by the camera 100. The shadow region extraction unit 104 extracts, from the captured image, the shadow 402 formed on the right side of the finger 30. In S1104, the contour detection unit 105 detects the contour 502 on the right side of the shadow 402.

In S1105, the touch point detection unit 106 determines whether or not there is a place where the shortest distance d' between the detected contours 501 and 502 is equal to or less than the threshold value dth'. This threshold value dth' is defined in such a way that it is possible to identify the distance d0' between the contours when a finger is touching in FIG. 10B. If the result of the determination is that there is such a place, processing advances to S1106. If there is no such a place, processing returns to S1101, and the aforementioned processing is repeated.

In S1106, the touch point detection unit 106 determines, as a touch point, the vicinity (left side) P' of the place (place where the shortest distance d' is equal to or less than the threshold value dth') detected in S1105, and calculates the coordinate values of the touch point on the operation surface 22. The output unit 130 outputs the calculated touch point coordinates as detection result data 150.

In S1107, it is determined whether the touch point detection is to be continued due to an instruction or the like from the user, and if the touch point detection is to be continued, processing returns to S1101 and the aforementioned processing is repeated.

In the aforementioned processing flow, a description has been given with respect to the case where the two illuminations 101 and 102 are installed on the same side of the camera 100; however, when the two illuminations 101 and 102 are installed on opposite sides on either side of the camera 100, it is preferable for the contour 501 on the left side of the shadow 401 and the contour 502 on the right side of the shadow 402 to be detected as depicted in FIG. 5, and the shortest distance therebetween to be obtained.

As described above, the operation detection device of the second embodiment uses one camera and two illuminations and alternately turns on the two illuminations to thereby detect the contours of two shadows projected by each of the two illuminations. A place where the shortest distance between the contours has approached within a predetermined distance is then determined as a touch point, and the coordinates of the touch point are output. In the second embodiment, because the two shadows are able to be temporally separated and extracted, it is possible for detection to be performed correctly even if the two illuminations are installed on the same side of the camera. Therefore, the degree of freedom with regard to the installation of the illuminations increases.

Third Embodiment

In a third embodiment, a configuration is implemented in which the touch point of a finger is detected by using a plurality of illuminations for the illuminations of the operation detection device 1.

Figure 12:
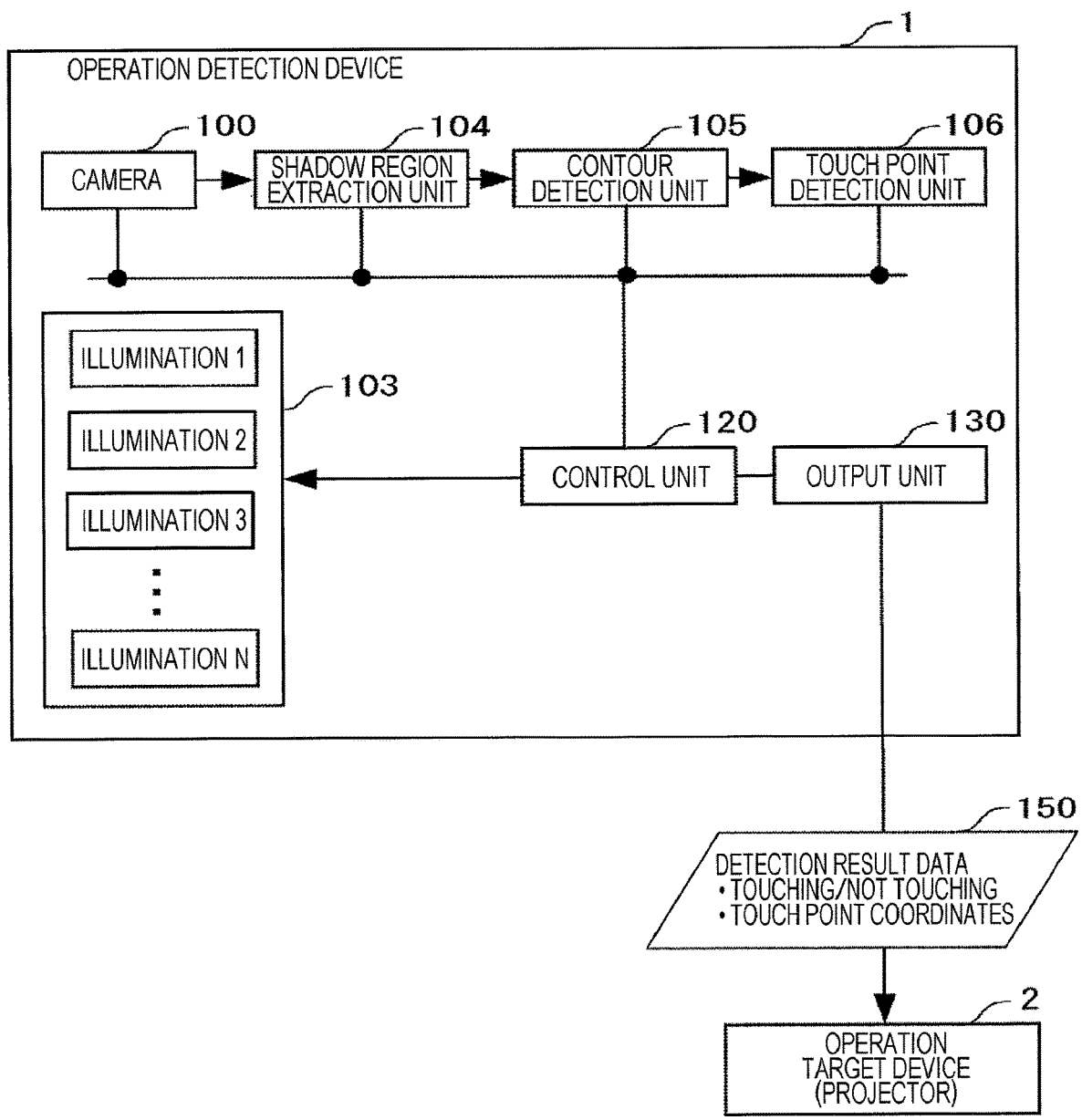
FIG. 12 is a configuration diagram of an operation detection device according to a third embodiment.

FIG. 12 depicts a configuration diagram of an operation detection device according to the third embodiment. The difference with the first embodiment (FIG. 1) is that the two illuminations 101 and 102 have been replaced by a plurality of (N) illuminations 103. The plurality of illuminations 103 are arranged at mutually offset positions with respect to the camera 100, and are all turned on at the same time.

Figure 13:
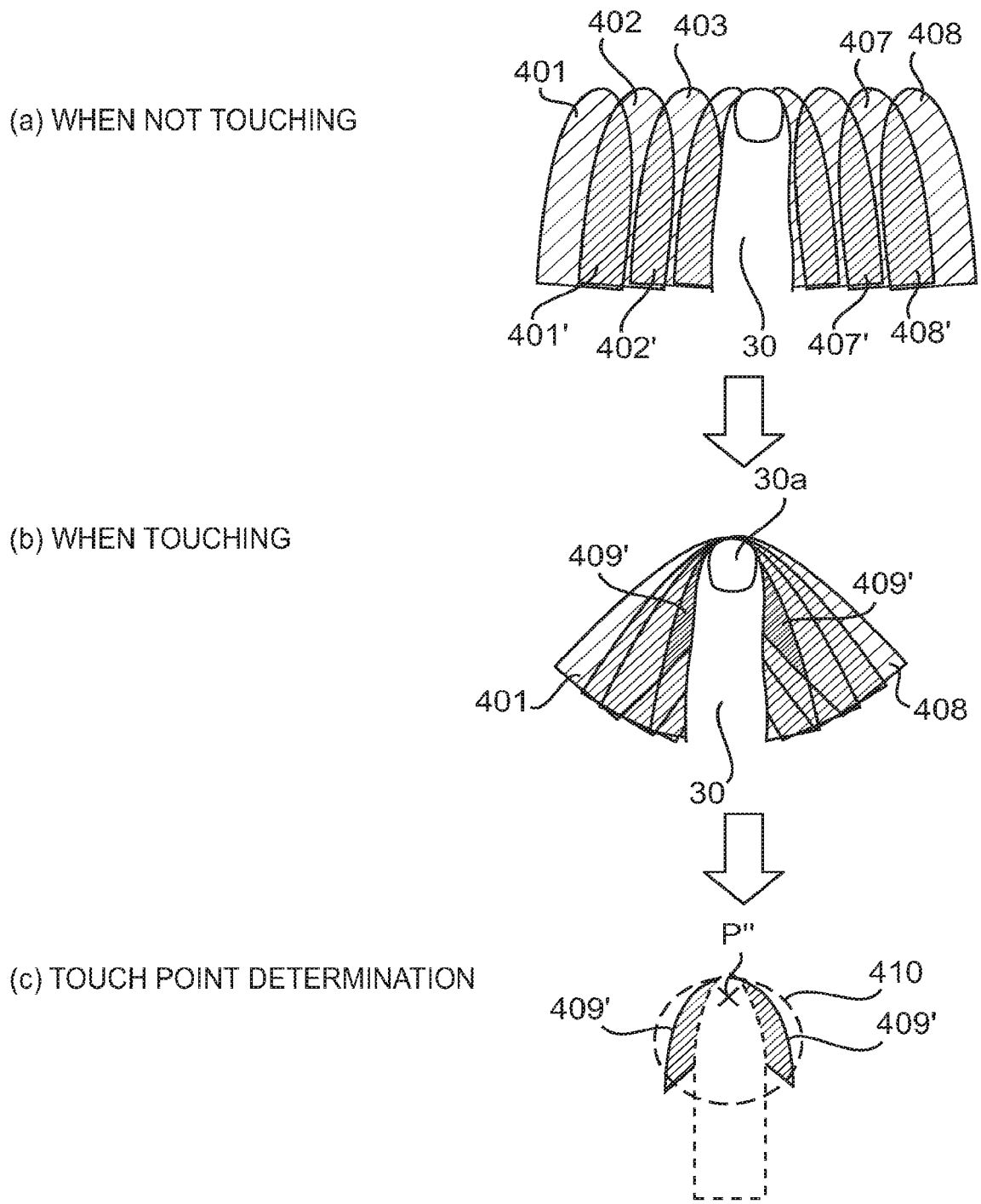
FIG. 13 is a drawing depicting the shapes of the shadows of a finger caused by a plurality of illuminations.

FIG. 13 is a drawing depicting the shapes of the shadows of a finger of a user captured by a camera when the plurality of illuminations 103 are used. Here, the case where eight (N=8) illuminations are arranged with four illuminations on each side of the camera 100 is depicted. The case where the finger 30 is not touching the operation surface 22 is depicted in (a), the case where the finger 30 has touched the operation surface 22 is depicted in (b), and the method for determining the touch point is depicted in (c). As depicted in (a), when the finger 30 is not touching the operation surface 22, a plurality (N=8) of shadows 401 to 408 that are projected by the plurality of illuminations 103 on the left and right of the finger 30 are formed. When the finger approaches the operation surface 22, overlapping sections 401' to 408' are produced between adjacent shadows.

As depicted in (b), when the finger 30 is touching the operation surface 22, the plurality of shadows 401 to 408 concentrate at the fingertip 30a. As a result, a portion in which the plurality of shadows overlap is produced in the vicinity of the fingertip 30a. When the shadows overlap, the density (darkness) of the shadows increases in accordance with the number of overlapping shadows, and in the regions 409', all (four shadows on each side) of the shadows overlap and the shadow density becomes the maximum. Maximum shadow density sections 409' are extracted by defining a brightness threshold value Lth' based on the fact that the shadow brightness in the maximum shadow density sections 409' is the lowest.

In (c), the maximum shadow density sections 409' (where the shadow brightness is equal to or less than the threshold value Lth') are extracted on both sides of the finger, and a region 410 surrounding these is defined as a touch region. The highest fingertip-side section P''' of the touch region 410 is then determined as the touch point of the finger.

Figure 14:
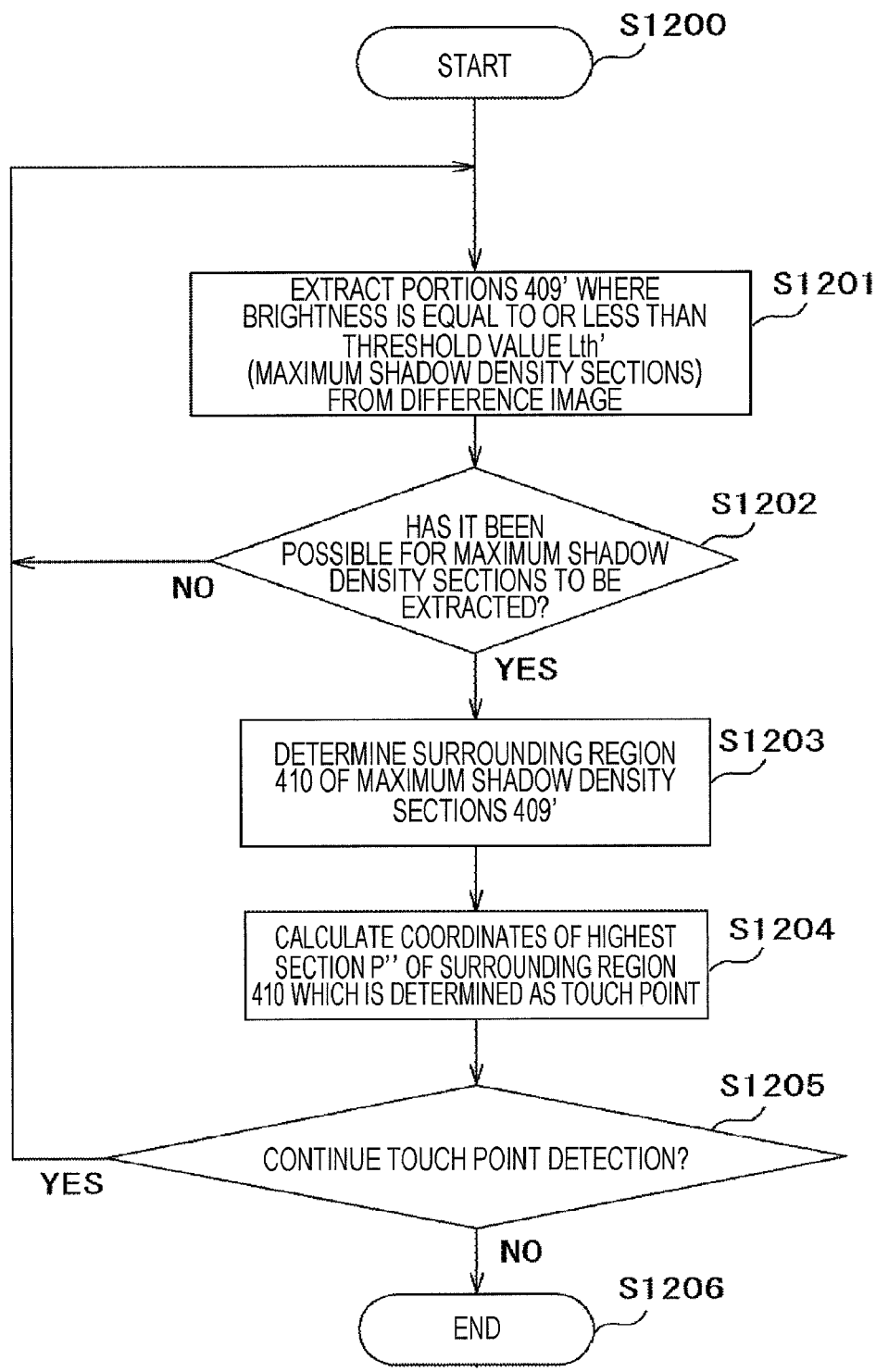
FIG. 14 is a drawing depicting the processing flow for touch point detection in the third embodiment.

FIG. 14 is a drawing depicting the processing flow for touch point detection in the third embodiment.

In S1200, the operation detection device 1 turns on the plurality of illuminations 103, and starts processing for detecting the touch point of a finger.

In S1201, the shadow region extraction unit 104 extracts a plurality of shadows from an image captured by the camera 100. At such time, in the shadow region extraction unit 104, the brightness threshold value Lth' for when shadows are extracted is defined in such a way that the maximum shadow density sections 409' in which a plurality of shadows overlap are extracted.

In S1202, in the shadow region extraction unit 104, it is determined whether or not it has been possible for the maximum shadow density sections 409' to be extracted. If it has been possible for the shadows 409' to be extracted, processing advances to S1203. If extraction is not possible, processing returns to S1201.

In S1203, the contour detection unit 105 determines the region 410 that surrounds the maximum shadow density sections 409' extracted in S1202. This region 410 becomes the finger touch region.

In S1204, the touch point detection unit 106 determines, as a touch point, the highest fingertip-side section P''' of the region 410 extracted in S1203, and calculates the coordinate values of the touch point on the operation surface 22.

In S1205, it is determined whether the touch point detection is to be continued due to an instruction or the like from the user, and if the touch point detection is to be continued, processing returns to S1201 and the aforementioned processing is repeated.

As described above, the operation detection device of the third embodiment uses one camera and a plurality of illuminations to detect a portion in which the density of shadows projected by the plurality of illuminations is the maximum. It is possible to determine a touch point from this portion in which the shadow density is the maximum. This procedure can be applied to the case where a plurality of shadows overlap, and the number of illuminations may be an arbitrary number equal to or greater than two. In the present embodiment, because the touch point can be detected merely by determining the density (brightness) of shadows, there are effects that there are few processing steps and the detection speed is increased.

Fourth Embodiment

In a fourth embodiment, a description is given with respect to the configuration of a projector that has the aforementioned operation detection device 1 incorporated therein.

Figure 15:
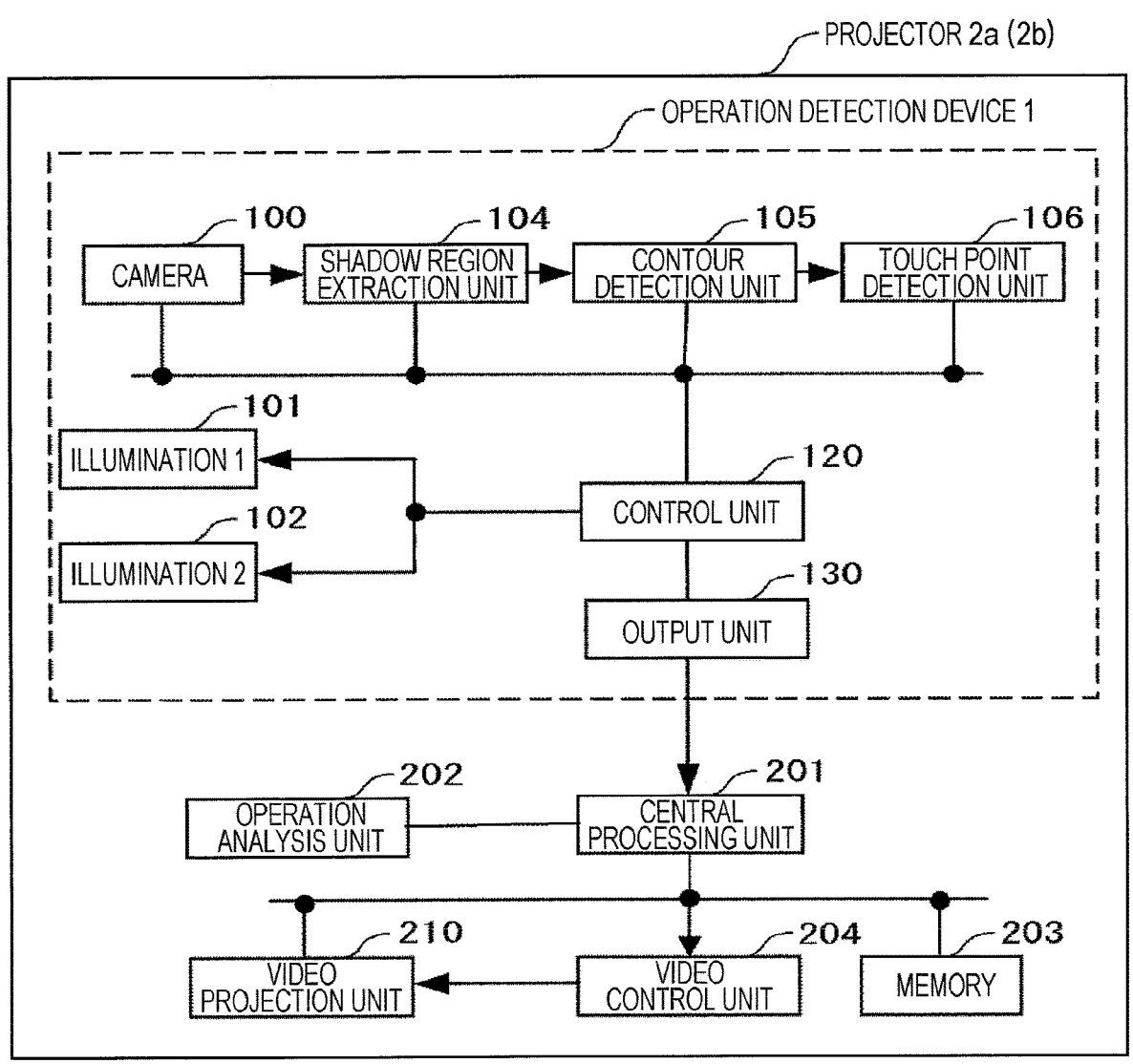
FIG. 15 is a configuration diagram of a projector according to a fourth embodiment.

FIG. 15 depicts a configuration diagram of a projector 2a (2b) according to the fourth embodiment. Here, the projector 2a (2b) has the operation detection device 1 mentioned in the first embodiment (FIG. 1) incorporated therein, and also has a configuration for projecting video added thereto as a projector function. The projector 2a (2b) has, as the functions of a projector, a central processing unit 201, an operation analysis unit 202, a memory 203, a video control unit 204, and a video projection unit 210.

The central processing unit 201 is configured from a semiconductor chip such as a central processing device (CPU) and software such as an operating system (OS), and on the basis of user operations and so forth detected by the operation analysis unit 202, controls the input and output of information to the memory 203, and each of the units such as the video control unit 204 and the video projection unit 210.

The operation analysis unit 202 is configured from a circuit board or software or the like, and on the basis of the coordinates of a touch point obtained from the output unit 130 of the operation detection device 1, detects a user operation with respect to projected video by determining the correspondence between the video being projected and the touch point.

The memory 203 is configured from a semiconductor and so forth, and stores information required for calculations and control performed by the central processing unit 201, and video information and so forth that is displayed as projected video.

The video control unit 204 is configured from a circuit board and so forth, performs calculation processing required for drawing video information, in accordance with control performed by the central processing unit 201, and outputs drawing information made up of a set of pixels, in a format suitable for input to the video projection unit 210.

The video projection unit 210 is configured from a light source such as a lamp, optical components such as a lens and a reflection mirror, and a liquid crystal panel and so forth, modulates beams of light emitted from the light source, forms image light corresponding to the drawing information sent from the video control unit 204, and expands and projects the image light onto a projection surface such as a screen.

It should be noted that, although the units of FIG. 15 are independent of each other, they may be configured from one or a plurality of constituent elements as required. For example, units 201 to 204 may be configured in such a way that the processing thereof is performed by one or a plurality of semiconductor chips (system-on-a-chip (SoC) or the like).

Figure 16:
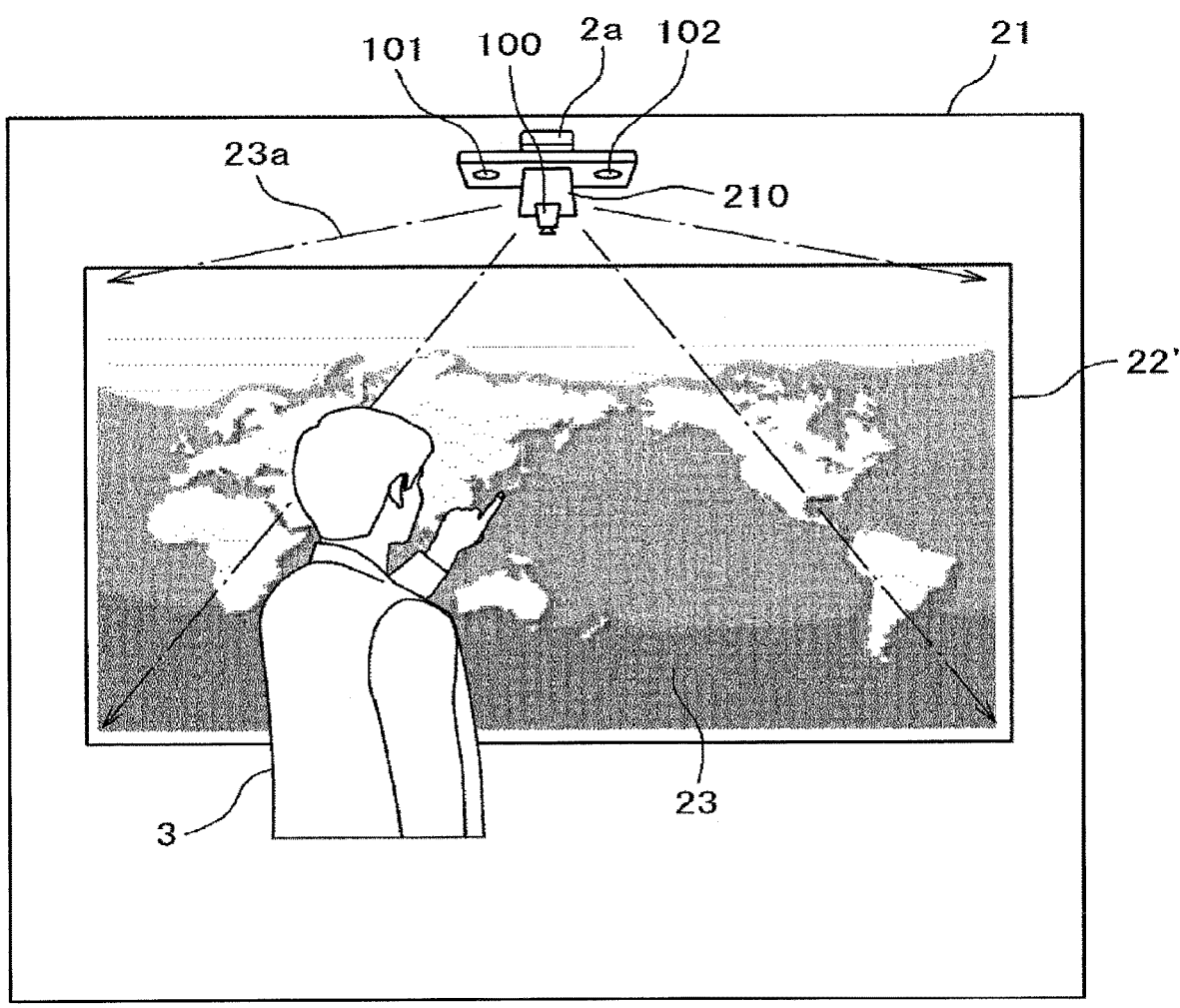
FIG. 16 is a front view depicting the operation state of a short projection-type projector.
Figure 17:
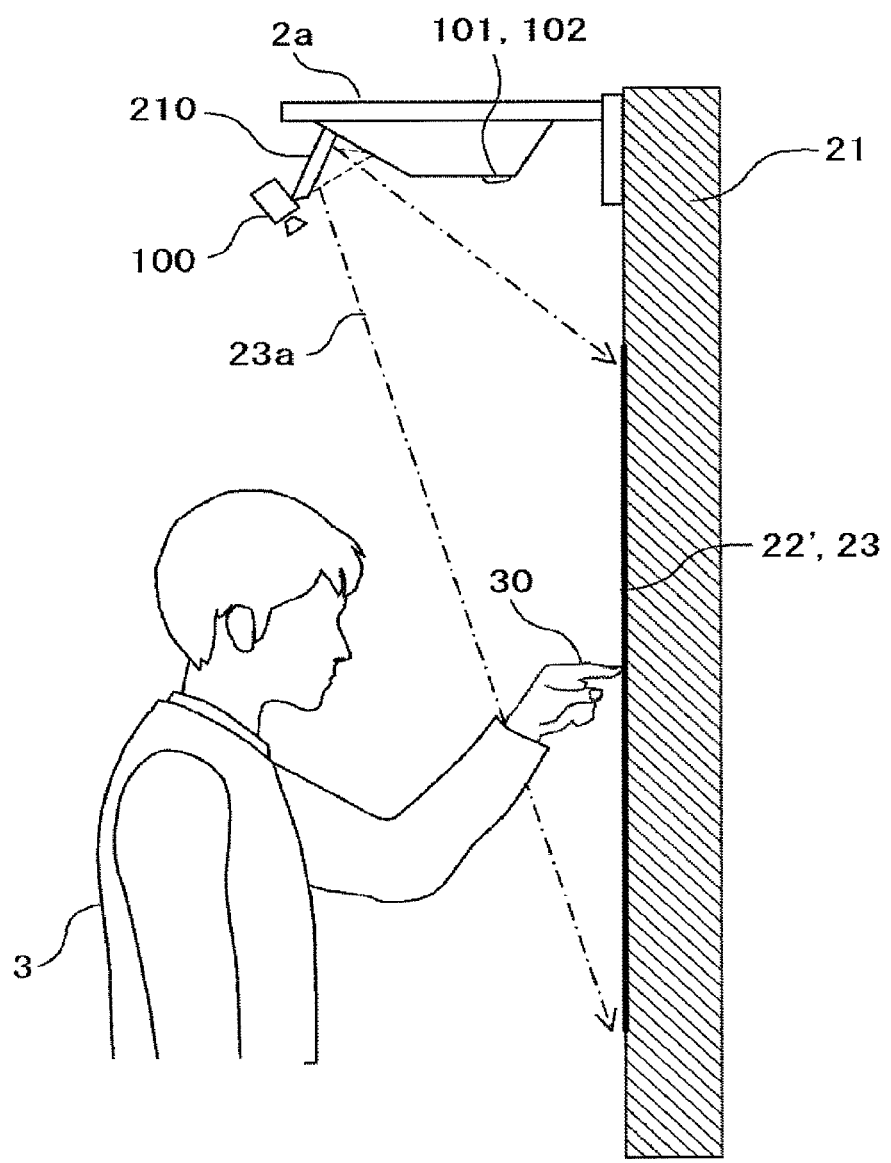
FIG. 17 is a side view depicting the operation state of a short projection-type projector.

FIG. 16 and FIG. 17 are external views depicting an example of a short projection-type projector 2a as the projector. FIG. 16 is a front view depicting a state in which a user is performing an operation, and FIG. 17 is a side view. The short projection-type projector 2a is attached to the upper section of the wall surface 21. By emitting projection light 23a from the video projection unit 210 on the basis of a predetermined video signal such as a GUI, projected video 23 is projected onto a screen 22' on the wall surface 21. The user 3 performs a finger operation on the screen 22' that also serves as an operation surface, and is thereby able to control the display and so forth of the projected video 23.

When the user 3 touches an arbitrary place of the projected video 23 with a finger 30, the operation detection device 1 detects a touch point from a shadow image of the finger, and sends the detection data to the operation analysis unit 202 by way of the central processing unit 201. The operation analysis unit 202 analyses the operation content with respect to the projected video 23, and the central processing unit 201 executes processing such as a video alteration corresponding to the user operation. By incorporating the operation detection device 1 inside the projector 2a in this way, the user is able to efficiently perform an operation with respect to projected video, and, particularly in the present embodiment, is able to suitably perform a multi-touch operation.

Figure 18:
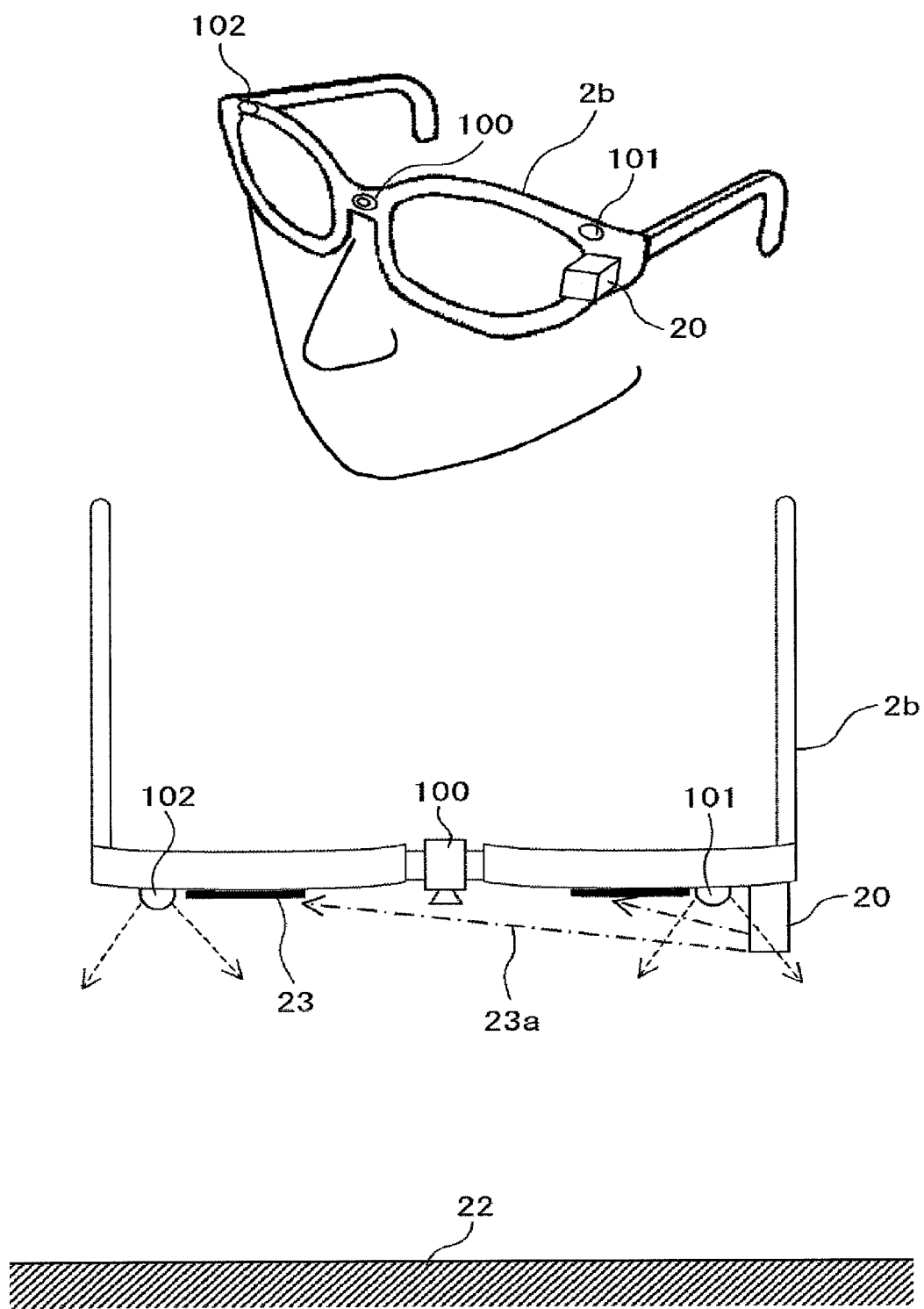
FIG. 18 is an external view depicting an example of a head-mounted projector.

FIG. 18 is an external view depicting an example of a head-mounted projector 2b as another configuration of the projector. In the head-mounted projector 2b, a small projector main body 20 is attached to a spectacles-type housing, video 23 is projected by projection light 23a being emitted onto the lens surfaces of the spectacles, and the user is able to view video.

Furthermore, an illumination 101 and an illumination 102 are attached to both ends of the spectacles-type housing, a camera 100 is attached to the center of the housing, and together with it being possible to irradiate an operation surface 22 that is in the line of sight of the user, it is possible to capture a finger operation performed by the user on the operation surface 22 and to detect the touch point thereof.

Therefore, the video 23 projected onto the lens surfaces of the spectacles by the small projector main body 20 and the operation surface 22 on which the user performs an operation overlap in the field of vision of the user and behave as if the video is being displayed on the operation surface 22. In other words, when the small projector main body 20 has displayed a video, the user is able to perform a multi-touch operation with respect to the displayed video by touching the operation surface 22 with a fingertip.

As described above, by incorporating the operation detection device inside the projector, an effect is obtained in that it is possible for projected video to be operated in a multi-touch manner without providing a sensor or the like on a video projection surface.

It should be noted that the present embodiments described above are exemplifications for describing the present invention, and are not intended to restrict the scope of the present invention to only the embodiments.

What is claimed is:

1. A projector apparatus comprising:
   a video projector that projects a video;
   a first illuminator and a second illuminator that irradiate illumination light from different positions onto an operation surface at least part of which overlaps a surface on which the video is projected by the video projector;
   a camera that captures, together with a plurality of fingers of a user, at least part of the operation surface onto which the illumination light has been irradiated; and
   a processor and a memory storing software that, when executed by the processor, causes the processor to:
   detect, on the basis of a plurality of captured images obtained by the camera, a first shadow of the plurality of fingers of the user produced by the first illuminator and a second shadow of the plurality of fingers of the user produced by the second illuminator, and
   detect, on the basis of the detected first shadow and the detected second shadow, a plurality of touch points of the plurality of fingers of a same hand of the user on the operation surface,
   wherein the first illuminator and the second illuminator are arranged in parallel to the operation surface, and temporally alternate illuminating the illumination light,
   wherein the first shadow and the second shadow are detected separately by temporally alternating detecting the alternating illumination light of the first illuminator and the second illuminator, and
   wherein each of the touch points is respectively detected based on a respective distance of a pair of end sections of contours of the detected first shadow and the detected second shadow corresponding to a respective finger of the plurality of fingers.

* * * * *